US 7,451,381 B2

(12) United States Patent
Miller et al.

(10) Patent No.: US 7,451,381 B2
(45) Date of Patent: Nov. 11, 2008

(54) RELIABLE METHOD AND SYSTEM FOR EFFICIENTLY TRANSPORTING DYNAMIC DATA ACROSS A NETWORK

(75) Inventors: Michael J. Miller, Pleasant Grove, UT (US); Lyman D. Horne, Salt Lake City, UT (US); W. Paul Willes, Alpine, UT (US); Douglas M. Grover, Elk Ridge, UT (US)

(73) Assignee: Phonex Broadband Corporation, Midvale, UT (US)

( * ) Notice: Subject to any disclaimer, the term of this patent is extended or adjusted under 35 U.S.C. 154(b) by 578 days.

(21) Appl. No.: 10/772,034

(22) Filed: Feb. 3, 2004

(65) Prior Publication Data

US 2005/0172199 A1  Aug. 4, 2005

(51) Int. Cl.
*H03M 13/35* (2006.01)
(52) U.S. Cl. ...................... 714/774; 714/776
(58) Field of Classification Search ............... 714/774, 714/776
See application file for complete search history.

(56) References Cited

U.S. PATENT DOCUMENTS

| 4,823,345 | A |   | 4/1989 | Daniel et al. ............... 371/37 |
| 4,858,017 | A |   | 8/1989 | Torbey ....................... 358/426 |
| 4,941,144 | A |   | 7/1990 | Mizukami ................... 371/5.5 |
| 5,375,119 | A |   | 12/1994 | Koivu ......................... 370/82 |
| 5,410,546 | A |   | 4/1995 | Boyer et al. ............... 371/37.1 |
| 5,414,650 | A |   | 5/1995 | Hekuis ................... 364/715.02 |
| 5,497,371 | A |   | 3/1996 | Ellis et al. .................... 370/60 |
| 5,579,303 | A | * | 11/1996 | Kiriyama .................... 370/252 |
| 5,608,396 | A |   | 3/1997 | Cheng et al. .................. 341/50 |
| 5,638,384 | A |   | 6/1997 | Hayashi et al. ............ 371/37.1 |
| 5,699,369 | A | * | 12/1997 | Guha ......................... 714/774 |
| 5,717,689 | A | * | 2/1998 | Ayanoglu .................... 370/349 |
| 5,742,592 | A |   | 4/1998 | Scholefield et al. ......... 370/329 |
| 5,815,516 | A |   | 9/1998 | Aaker et al. .................. 371/53 |
| 5,896,374 | A |   | 4/1999 | Okumura et al. ............ 370/311 |
| 6,154,780 | A |   | 11/2000 | Zhu ............................ 709/236 |
| 6,477,669 | B1 | * | 11/2002 | Agarwal et al. ............. 714/708 |
| 2001/0037481 | A1 |   | 11/2001 | Suzuki et al. ............... 714/758 |
| 2002/0174399 | A1 |   | 11/2002 | Keller ........................ 714/781 |

* cited by examiner

*Primary Examiner*—Stephan M Baker
(74) *Attorney, Agent, or Firm*—Snell & Wilmer L.L.P.

(57) ABSTRACT

A data networking system designed to provide efficient, yet reliable, transportation of data across a time division multiplexed network. This invention allows for redundantly sending data segments wherein if bad data segments are received, they can be resent in a dynamic manner depending on the network condition and segments can be fragmented, resized and sent with low overhead due to dynamic header sizes, segment sizes, forward error correction, and cyclic redundancy checks. The result is a very adaptive network that meets the demanding requirements of networks such as power line and wireless while still being able to transport data for voice, audio, video, computer, control, and the like.

34 Claims, 40 Drawing Sheets

RELIABLE METHOD AND SYSTEM FOR EFFICIENTLY TRANSPORTING DYNAMIC DATA ACROSS A NETWORK

BACKGROUND OF THE INVENTION

1. Field of the Invention

This invention relates to electronic communications systems. More specifically this invention relates to fault tolerant transportation, fragmentation, and reassembly of segments within a communications system.

2. Description of Related Art

A variety of schemes have been used to provide reliable transportation of data across a network. Typically, protocols provide for guaranteed delivery of information and fragmentation of packets to send information across a network. However, these mechanisms are not typically designed for the dynamic environments of time division multiplexed power line networks which require efficient data transportation coupled low packet overhead and strong data protection. For a general background material, the reader is directed to the following United States patents, each of which is hereby incorporated by reference in its entirety for the material contained therein: U.S. Patent Numbers and Patent Application Numbers: 2002/0174399, 2001/0037481, U.S. Pat. Nos. 6,154,780, 5,896,374, 5,815,516, 5,742,592, 5,638,384, 5,608,396, 5,497,371, 5,414,650, 5,410,546, 5,375,119, 4,941,144, 4,858,017, and 4,823,345.

SUMMARY OF THE INVENTION

It is desirable to provide a system for reliably sending data across a network which is efficient yet adaptable to changing network conditions.

Therefore it is the general object of an embodiment of this invention to provide a system for reliably sending data across a network by acknowledging segments based on the segment length.

It is a further object of an embodiment of this invention to provide a system for reliably sending data across a network by not sending an acknowledgment segment which indicates an error.

It is a further object of an embodiment of this invention to provide a system for reliably sending data across a network by sending a negative acknowledgement segment.

It is a further object of an embodiment of this invention to provide a system for reliably sending data across a network by sending a positive acknowledgement segment.

It is a further object of an embodiment of this invention to provide a system for reliably sending data across a network based on a resend value.

It is a further object of an embodiment of this invention to provide a system for reliably sending data across a power line network, a wireless network, a light frequency network and a wired network.

It is a further object of an embodiment of this invention to provide a system for reliably sending data across a network by sending the same packet multiple times based on a send value.

It is a further object of an embodiment of this invention to provide a system for reliably sending data across a network by sending broadcast segments multiple times based on a send value.

It is a further object of an embodiment of this invention to provide a system for reliably sending data across a network by sending non-broadcast segments multiple times based on a send value.

It is a further object of an embodiment of this invention to provide a system for sending and receiving variable length segments and error correcting information based on a preamble and a variable length error detecting field.

It is a further object of an embodiment of this invention to provide a system for sending and receiving variable length segments and error correcting information across a power line network, a wireless network, a light frequency network, and a wired network.

It is a further object of an embodiment of this invention to provide a system for sending and receiving variable length segments and error correcting information where the error detecting field's length is based on the preamble.

It is a further object of an embodiment of this invention to provide a system for sending and receiving variable length segments and error correcting information where the segment's length is based on the preamble.

It is a further object of an embodiment of this invention to provide a system for sending and receiving variable length segments and error correcting information where the error detecting field is a cyclic redundancy check, a checksum, or parity.

It is a further object of an embodiment of this invention to provide a system for sending and receiving variable length segments and error correcting information where the preamble is 40 bits in length.

It is a further object of an embodiment of this invention to provide a system for sending and receiving variable length segments and error correcting information where the cyclic redundancy check is 30 bits.

It is a further object of an embodiment of this invention to provide a system for sending and receiving variable length segments and error correcting information where the cyclic redundancy check is 10 bits.

It is a further object of an embodiment of this invention to provide a system for sending and receiving variable length segments and error correcting information where the preamble is dynamically changed based on conditions within the network.

It is a further object of an embodiment of this invention to provide a system for sending and receiving variable length segments and error correcting information where the preamble is dynamically changed based on cyclic redundancy errors.

It is a further object of an embodiment of this invention to provide a system for sending and receiving segments using different forward error correction methods based on a preamble and a forward error correction method.

It is a further object of an embodiment of this invention to provide a system for sending and receiving segments using different forward error correction methods across a power line network, a wireless network, a light frequency network, and a wired network.

It is a further object of an embodiment of this invention to provide a system for sending and receiving segments using different forward error correction methods where the forward error correction method's size is based on the preamble.

It is a further object of an embodiment of this invention to provide a system for sending and receiving segments using different forward error correction methods where the segment size is based on the preamble.

It is a further object of an embodiment of this invention to provide a system for sending and receiving segments using different forward error correction methods where the forward error correction methods are Hamming codes, Convolutional codes, Reed-Solomon codes, Low Density Parity Check Codes, Trellis codes, Block Turbo codes or Walsh codes.

It is a further object of an embodiment of this invention to provide a system for sending and receiving segments using different forward error correction methods where the forward error correction method uses 22 out of 32 bits.

It is a further object of an embodiment of this invention to provide a system for sending and receiving segments using different forward error correction methods where the preamble indicates no forward error correction.

It is a further object of an embodiment of this invention to provide a system for sending and receiving segments using different forward error correction methods where the preamble is dynamically changed based on network conditions.

It is a further object of an embodiment of this invention to provide a system for sending and receiving segments using different forward error correction methods where the preamble is dynamically changed based on cyclic redundancy check errors.

It is a further object of an embodiment of this invention to provide a system for sending and receiving converted data on a network where binary data is sent across non-binary time slots.

It is a further object of an embodiment of this invention to provide a system for sending and receiving converted data on a power line network, a wireless network, a light frequency network, and a wired network.

It is a further object of an embodiment of this invention to provide a system for sending and receiving converted data on a network where the time slot width is 10 bits.

It is a further object of an embodiment of this invention to provide a system for sending and receiving converted data on a network where the binary data is a power of two.

It is a further object of an embodiment of this invention to provide a system for sending and receiving segments on a network by breaking upper-layer packets into segments.

It is a further object of an embodiment of this invention to provide a system for sending and receiving segments on a power line network, a wireless network, a light frequency network, and a wired network.

It is a further object of an embodiment of this invention to provide a system for sending and receiving segments on a network where the segment contains a MAC field, a last segment field, a socket field, a segment data length field, a version number, Forward Error Correction field, an encryption field, a segment number field, an ARQ field, a source network number field, a destination network number field, a segment number, a source node number, or a destination node number.

It is a further object of an embodiment of this invention to provide a system for sending and receiving segments on a network where the upper-layer packets use protocols such as: Internet Protocol, User Datagram Protocol, Transmission Control Protocol, Integrated Services Digital Network, Hyper Text Markup Language, Secure Sockets Layer, X.10, Common Application Language, Simple Control Protocol, or LonTalk.

It is a further object of an embodiment of this invention to provide a system for sending and receiving segments on a network where segments are resent based on segment errors.

It is a further object of an embodiment of this invention to provide a system for sending and receiving segments on a network where segments are sent in order.

It is a further object of an embodiment of this invention to provide a system for sending and receiving segments on a network where segments are sent out of order.

It is a further object of an embodiment of this invention to provide a system for sending and receiving segments on a network where a segment is sent on a single time slot.

It is a further object of an embodiment of this invention to provide a system for sending and receiving segments on a network where a segment is sent on multiple time slots.

It is a further object of an embodiment of this invention to provide a system for sending and receiving segments on a network where duplicate packets are dropped.

These and other objects of this invention will be readily apparent to those of ordinary skill in the art upon review of the following drawings, detailed description, and claims. In the preferred embodiment of this invention, the system for data transportation across a network makes use of a novel mechanism for reliably sending and acknowledging segments across a network. In addition, other novel methods are used to allow the system to dynamically adjust segment size, error detection, and forward error correction based on network conditions to increase throughput on the network. The system uses novel methods for converting data size to fit into time slots.

BRIEF DESCRIPTION OF DRAWINGS

In order to show the manner that the above recited and other advantages and objects of the invention are obtained, a more particular description of the preferred embodiments of this invention, which is illustrated in the appended drawings, is described as follows. The reader should understand that the drawings depict only present preferred and best mode embodiments of the invention, and are not to be considered as limiting in scope. A brief description of the drawings is as follows.

Reference will now be made in detail to the present preferred embodiment of the invention, examples of which are illustrated in the accompanying drawings.

DETAILED DESCRIPTION

Figure 1A:
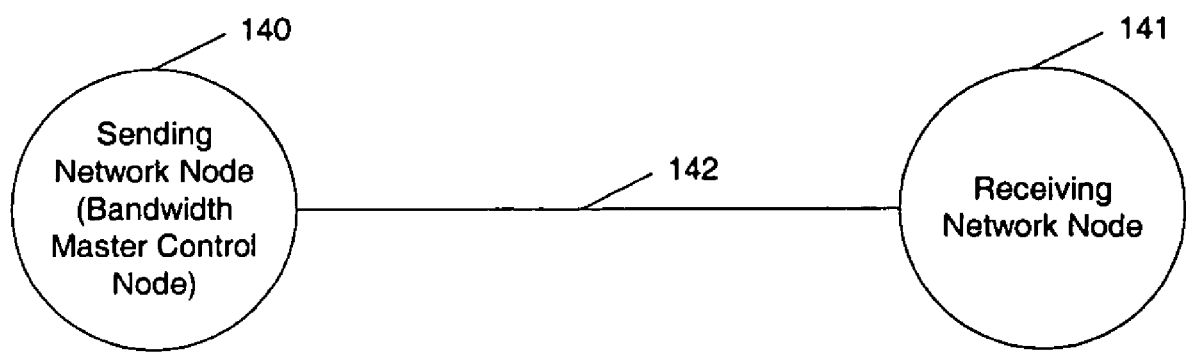
FIG. 1a is a diagram of the present preferred network for sending data segments between network nodes.

FIG. 1a is a diagram of the present preferred network for sending data segments 304 between network nodes. A network 142 is formed by plurality network nodes 140 and 141. One of the network nodes 140 is a sending network node and one is the receiving network node 141. Packets are sent across a time division multiplexed data transfer mechanism which comprises network 142 which further comprises time slots 120-136.

Figure 1B:
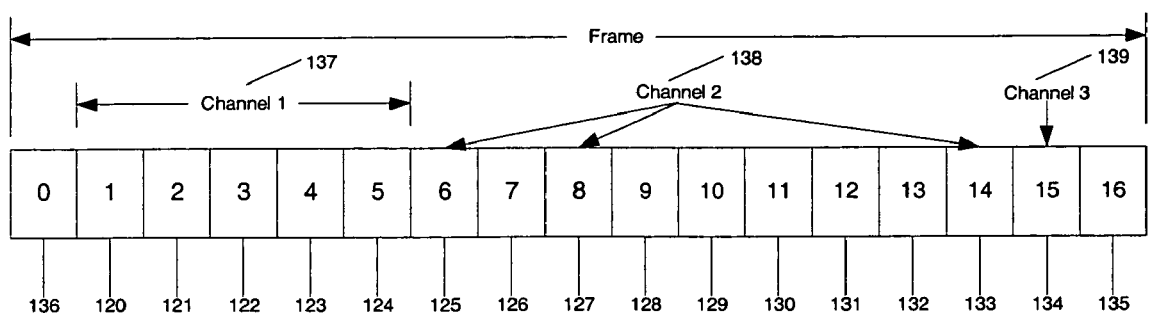
FIG. 1b is a diagram of the time division multiplexed data transfer mechanism of the present preferred embodiment of this invention used to transfer data on a network.

FIG. 1b is a diagram of the time division multiplexed data transfer mechanism of the present preferred embodiment of this invention used to transfer data on a network 142. Transfer of data across a network 142 occurs in two forms: packets which are broken up into segments and non-packet. Examples of data include but are not limited to voice, audio, control, video, and computer information and the like. A frame represents the bandwidth of the network 142 over time and consists of a plurality of time slots 120-136. Time slots 120-136 in the present preferred embodiment are equal size pieces of Time Division Multiplexed (TDM) bandwidth which is used to transfer data over the AC power line. Each time slot is 10 bits wide. The actual data sent is 32 bits with 22 bits used for forward error correction which results in 10 bits for each time slot. This is a $5/16$ rate code. Time slot 136 is used for frame synchronization across the network 142 and time slots 120-135 are used for data transfer. Data is sent using active channels, which are pieces of network 142 bandwidth. An active channel is a variable or fixed size pipe made up of a single time slot or a plurality of time slots used to form a packet or non-packet pipe. For example, an active channel 137 can comprise but is not limited to a group of contiguous slots 120-124. On the other hand, an active channel 138 can consist of noncontiguous slots 126, 128, 133. In addition, an active channel can comprise a single time slot 139 or any number of time slots up to the maximum number of time slots in the frame. An active channel is created by a Bandwidth Master Control Node which is a network node 140 responsible for creating active channels 137, 138, and 139 on a network 142. Any network node can assume the role of Bandwidth Master Control Node 140.

Figure 2:
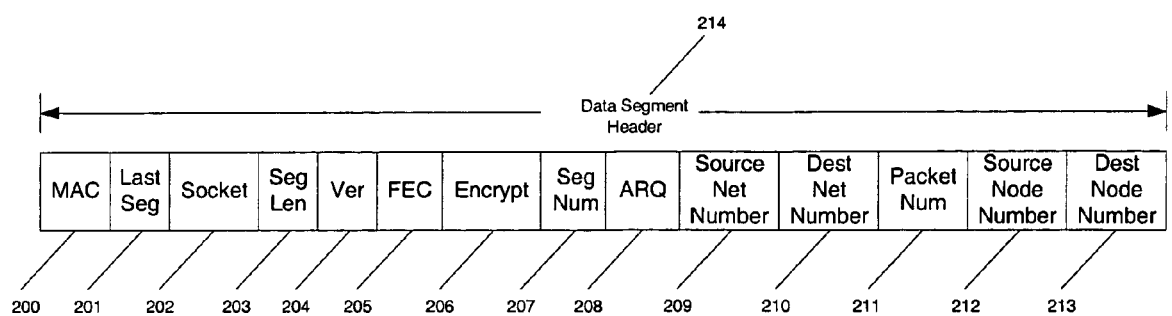
FIG. 2 is a diagram of the present preferred data segment header for data segments that are sent across a network.

FIG. 2 is a diagram of the present preferred data segment header 214 for data segments 304 that are sent on a network 142. Data segments 304 are pieces of larger upper layer packets 900 that are broken up and sent across a network 142. An upper layer packet 900 can be sent in a single data segment 304 if the upper layer packet's 900 size is small enough to fit into a single data segment 304. The data segment 304 header 214 is used to provide the necessary addressing and information to reassemble the data segments 304 into upper layer packets 900 on the receiving network node 141. The Media Access (MAC) field 200 is used to specify what type of segment is being sent. The MAC field can indicate a data segment 304 or a MAC layer segment such as a token passing algorithm, and other contention resolution algorithms, and the like. The present preferred embodiment uses a token passing algorithm. The last segment field 201 is used to indicate that this is the last data segment 304 of an upper layer packet 900. This allows the receiving network node 141 to know where the upper layer packet 900 ends so the receiving network node 141 can reassemble the full upper layer packet 900. The socket field 202 is used to identify specific applications on a sending network node 140 or a receiving network node 141. For example, if two network nodes 140 and 141 were communicating to each other with two separate programs such as Internet access and home control, each application would communicate using a unique socket number in the socket field 202. This way the data segments 304 would go to the correct application. The data segment length field 203 is used by the receiving network 141 node to determine the length of the data segment 304 and to validate the data segment error detection mechanism (CRC) 302. This field is also used to determine where the acknowledgement segment 303 is if the Automatic Repeat Request (ARQ) field 208 is on. The version number field 204 is used to identify the version of the protocol being used. As new versions of the segment header 214 are developed, the receiving network node 141 will know where each field is in the segment header 214. The Forward Error Correction (FEC) field 205 is used to indicate whether the data segment 304 has been encoded using forward error correction. The encryption field 206 is used to tell the receiving network node 141 that the data segment 304 is encrypted. The encryption field 206 can also be used to indicate the type of encryption such as single DEZ or triple DEZ, and the like. The segment number 207 is incremented for each segment sent and indicates the data segment number to the receiving network node 141 so the receiving network node 141 can reassemble the upper layer packets 900 into the proper order. The Automatic Repeat Request field 208 indicates how many times a data segment 304 is resent (resend value) if the acknowledgement segment 303 is not received successfully. The source network number field 209 is the network address on which the sending network node 140 resides. The destination network number 210 is the network number of the receiving network node 141. The packet number field 211 is used to identify which upper layer packet 900 that this data segment 304 belongs to. The packet number field 211 is used to reassemble the upper layer packet 900 successfully. The source node number 212 is the node address of the sending network node 140 and the destination node number 213 is the node address of the receiving network node 141.

Figure 3:
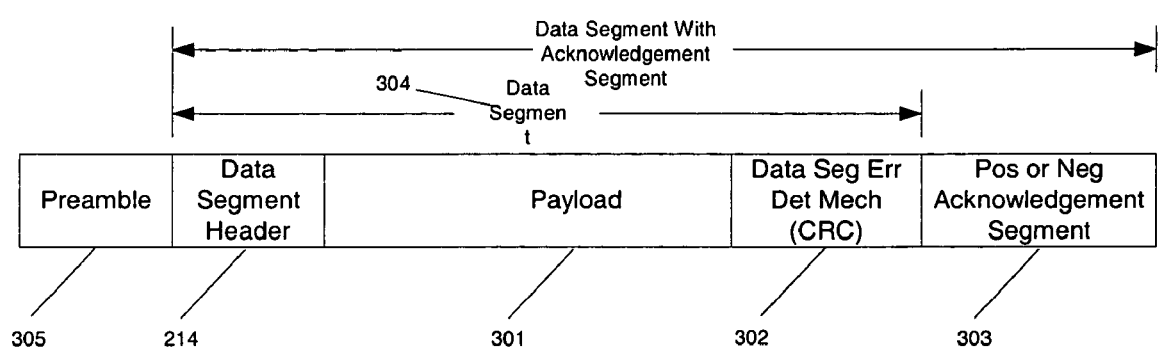
FIG. 3 is a diagram of the present preferred data segment structure with the accompanying acknowledgement segment.

FIG. 3 is a diagram of the present preferred data segment 304 structure with the accompanying acknowledgement segment 303. When the data segment 304 is received, the receiving network node 141 checks for a specific preamble 305 which is used to identify the start of the data segment 304. As the data segment 304 is received, the receiving network node 141 reads the segment header 214 and checks to see if the ARQ field 208 is set. The receiving network node 141 uses the segment length field 203 in order to know where the data segment error detection mechanism (CRC) 302 begins. The data segment error detection mechanism (CRC) 302 is performed by the sending network node 140 over the segment payload 301. The receiving network node 141 validates the data segment error detection mechanism (CRC) 302. If the data segment error detection mechanism (CRC) 302 is valid, an acknowledgement segment 303 is sent. The acknowledgement segment 303 does not require a preamble 305 because the receiving network node 141 knows to send the acknowledgement segment 303 at the end of the segment data segment error detection mechanism (CRC) 302. If the data segment error detection mechanism (CRC) 302 is not valid, the receiving network node 141 does not send an acknowledgement segment 303. The reason the receiving network node 141 does not send an acknowledgement segment 303 is because there may be errors in the segment header 214 including the ARQ field 208 which tells the receiving network node 141 that an acknowledgement segment 303 must be sent. If the sending network node 140 is expecting an acknowledgement segment 303, the sending network node 140 will see invalid acknowledgement segment error detection (CRC) 402 in the acknowledgement segment 303. If a valid acknowledgement segment 303 is sent but is received with bad data segment error detection mechanism (CRC) 402, the sending network node 140 will detect the error. In either case, the sending network node 140 will resend the segment (if ARQ was set) each time the acknowledgement segment 303 is received with an error or until the resend value is reached. If the receiving network node 141 receives the same data segment 304, the receiving network node 141 drops the duplicate data segments 304. The data segment error detection mechanism (CRC) 302 can be replaced with some other type of error correction such as a check sum, parity or the like if necessary.

Figure 4A:
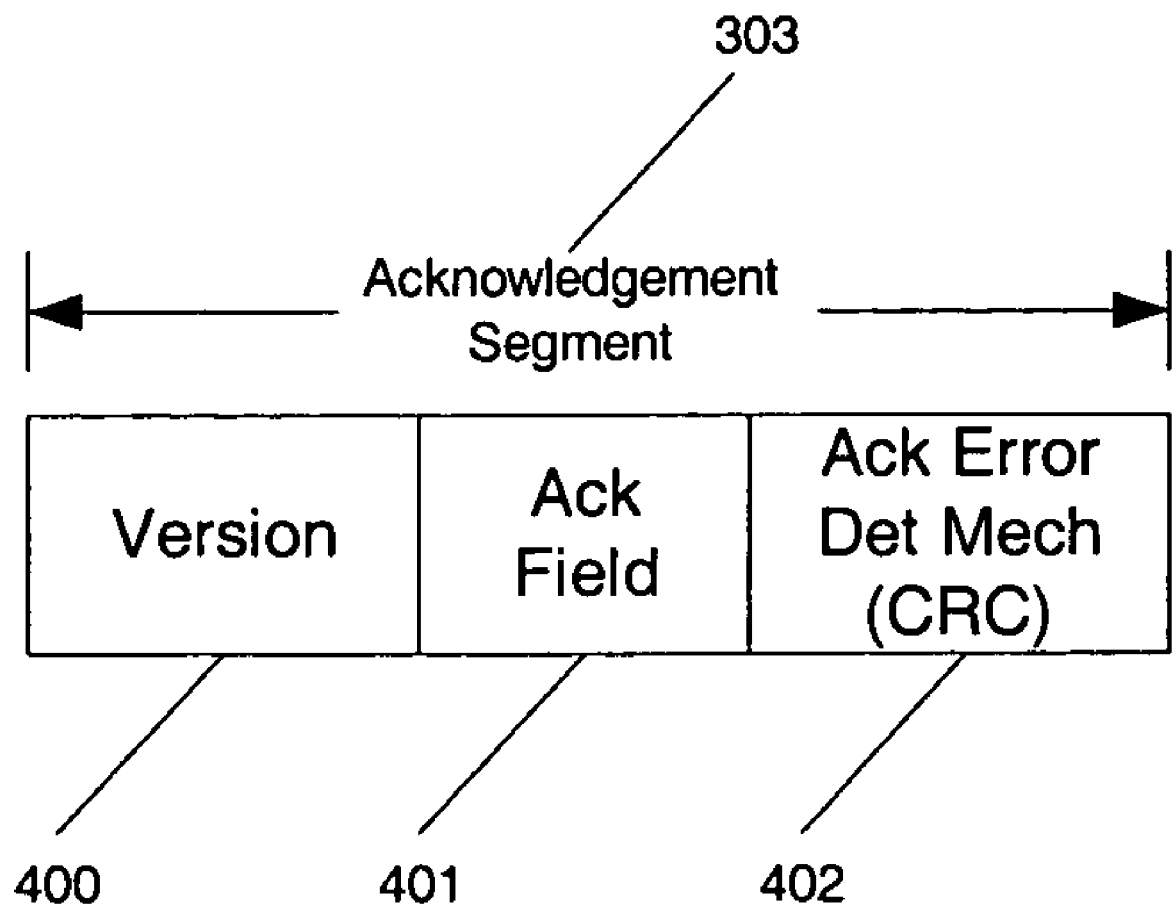
FIG. 4a is a diagram of the present preferred acknowledgement segment structure.

FIG. 4a is a diagram of the present preferred acknowledgement segment 303 structure. In the acknowledgement segment 303, the version field 400 is used to identify the protocol version of the acknowledgement segment 303. This allows for further changing of the acknowledgement segment 303 by changing the version of the acknowledgement segment 303. The acknowledgement field 401 is used to either positively or negatively acknowledge the data segment 304. An acknowledgement segment 303 can be a positive acknowledgement segment or a negative acknowledgement segment based on if the acknowledgement field is set to a positive acknowledgement or one of the negative acknowledgement values discussed as follows. Some of the reasons a receiving network node 141 may negatively acknowledge a data segment 304 are: 1) Out of receive buffer reject, 2) cipher reject (i.e. the data segment 304 may be encrypted when data segment 304 should not be encrypted). 3) Out of sequence reject (the data segment 304 may be out of sequence). 4) Unsupported version error (the data segment 304 may have an unsupported protocol version). The acknowledgement segment error detection mechanism (CRC) 402 is used to verify that the positive or negative acknowledgement segment 303 has been received correctly.

Figure 4B:
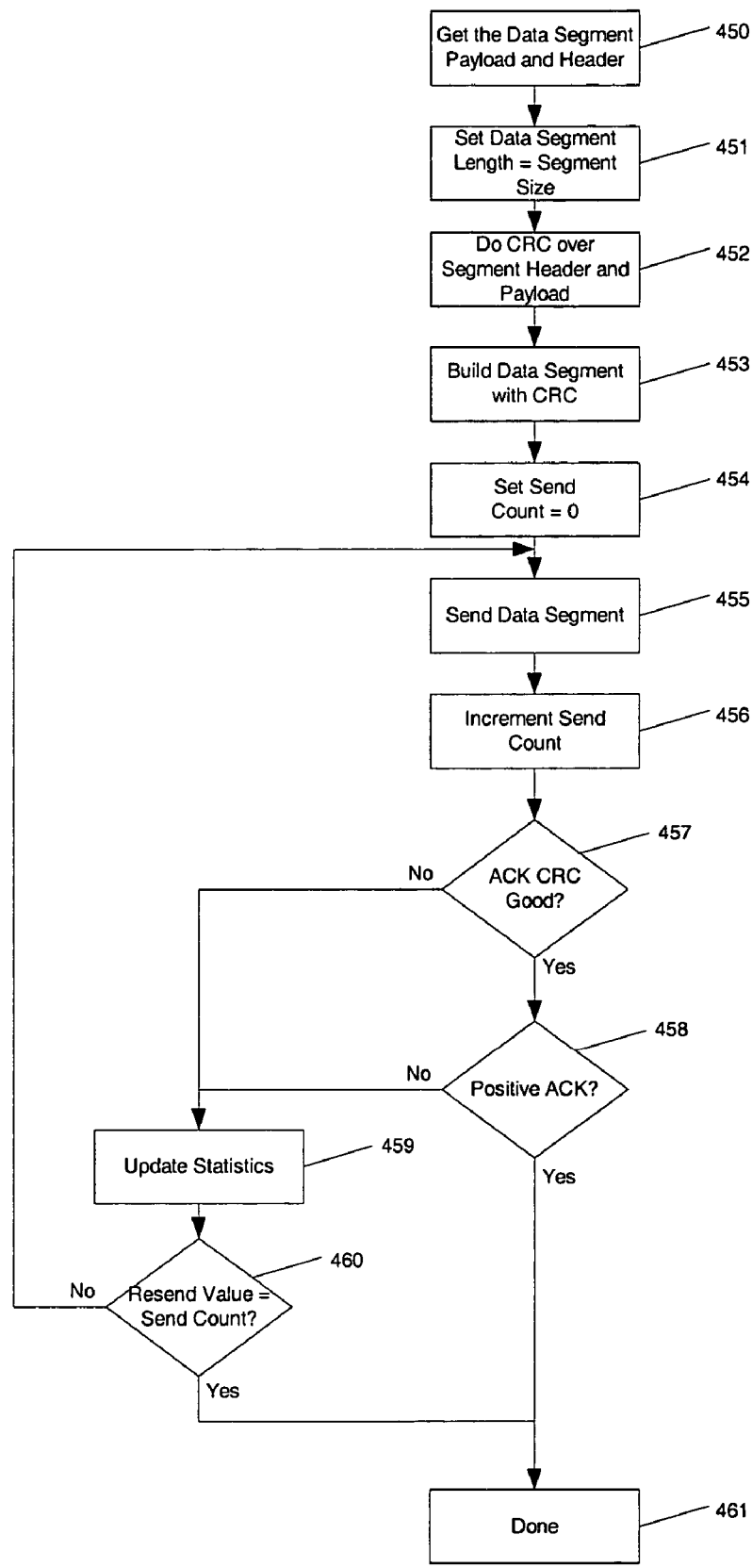
FIG. 4b is a flow diagram of the present preferred process for sending and resending data segments on a network.

FIG. 4b is a flow diagram of the present preferred process for sending and resending data segments 304 on a network 142. The process begins 450 when the sending network node 141 builds the data segment header 214 and data segment payload 301 that the sending network node 140 is going to send. The segment size length field 203 is set 451 to the segment size. A cyclic redundancy check (data segment error detection mechanism) is done 452 over the segment header 214 and payload 301. The data segment 304 is built 453 using the segment header 214, payload 301, and data segment error detection mechanism (CRC) 302. The send count is set 454 to zero. The data segment 304 is sent 455 and the send count is incremented 456. Since the acknowledgement segment 303 is sent based on the data segment length 203, the process checks in test 457 to see if the acknowledgement segment error detection mechanism (CRC) 402 is valid in the acknowledgement segment 303. If so the process goes to test 458. Otherwise, the statistics are updated 459 with the error. The resend value is compared to the send count in test 460. If they do not match the process repeats with the sending 455 of a data segment. Otherwise, the process is done 461. If in test 458 the acknowledgement segment is a positive acknowledgement segment 303, the process completes 461. Otherwise, the statistics are updated 459 with the negative acknowledgement segment 303 error and the process flows to test 460 as the process did with a bad CRC error.

Figure 4C:
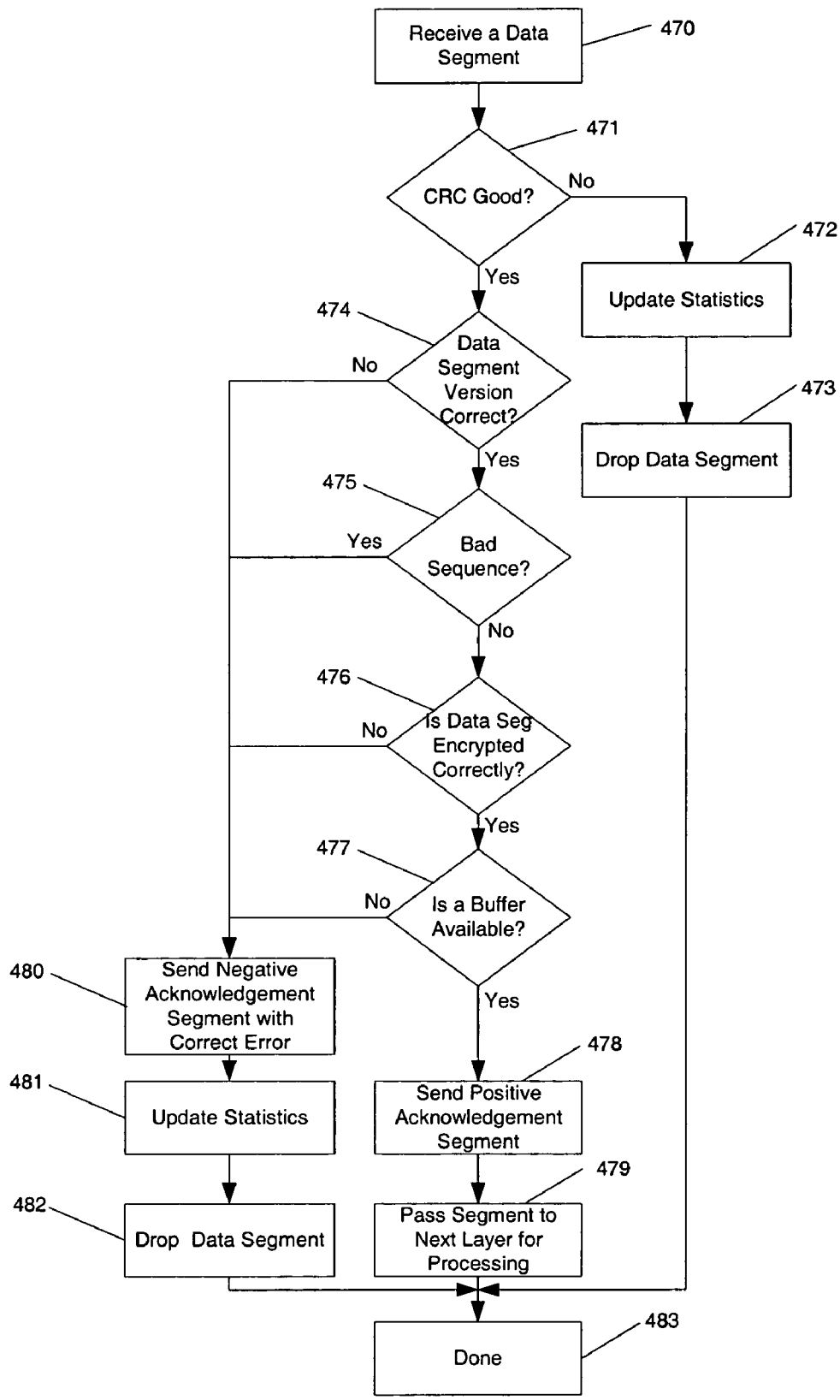
FIG. 4c is a flow diagram of the present preferred process for receiving and acknowledging data segments sent on a network.

FIG. 4c is a flow diagram of the present preferred process for receiving and acknowledging data segments 304 sent on a network 142. The process begins with the reception 470 of a data segment 304. The process checks the data segment error detection mechanism (CRC) 302 in test 471. If the data segment error detection mechanism (CRC) 302 is bad 471, the statistics are updated 472, the data segment 304 is dropped 473, and the process completes 483. Otherwise, if the data segment error detection mechanism (CRC) 302 is good in test 471, the process flows to test 474. If in test 474 the segment version 204 is correct the process flows to test 475. Otherwise the process flows to step 480. If test 475 has a bad sequence in the segment number 207, the process flows to step 480. Otherwise, the process continues to test 476. If test 476 detects a packet encryption error in the data segment 304 which is based on the encryption field 206, the process flows to step 480. Otherwise, the process continues to test 477. If a buffer for storing the data segment 304 is available in test 477, the process goes to step 478. Otherwise, the process goes to step 480. Step 480 is used for all error conditions that are detected within the data segment 304. There may be more errors like these in the future that need to be checked for. In step 480, a negative acknowledgement segment 303 is sent with the appropriate error code in the acknowledgement field 401 indicating the type of error that occurred. The statistics are updated 481, the data segment 304 is dropped 482, and the process completes 483. If all the tests 471, 474-477 are positive the process flows to step 478 which sends a positive acknowledgement segment 303 to the sending network node 141 that sent the data segment 304. The data segment 304 is stored in the buffer checked in test 477 and passed up to the next layer for processing 479 and then the process is done 483.

Figure 5A:
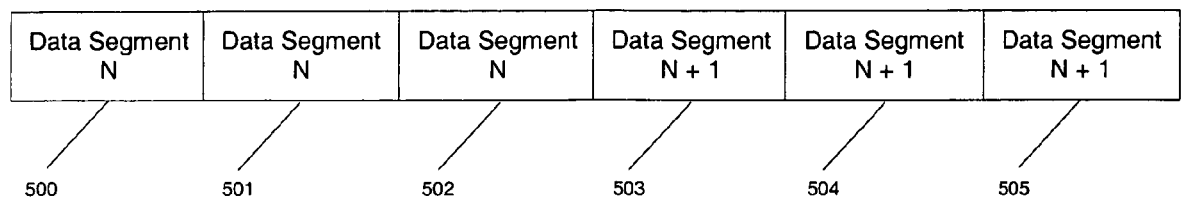
FIG. 5a is a diagram of the present preferred method for sending data segments redundantly across a network.

In order to ensure reliable sending of data segments 304, another method is needed to send data segments 304 such as broadcast or multi-cast data segments 304. A broadcast or multi-cast data segment is a data segment 304 with broadcast address or multi-cast address. Since broadcasts data segments 304 go to every node on the network, it would be difficult to acknowledge the broadcast data segment 304 from each network node 140,141 on the network 142. When a broadcast data segment 304 is sent, some of the nodes may receive the data segment 304 correctly, while others may not. To ensure that there is a greater chance that all the nodes on the network 142 will see a data segment 304, redundant segment sending was developed to ensure that broadcast and multi-cast data segments 304 will have a greater chance of being sent reliably across the network 142. Each data segment 304 is sent based on a segment send value. FIG. 5a is a diagram of the present preferred method for sending data segments 304 redundantly across a network 142. FIG. 5a illustrates an example of where the segment send value is three. When segment N is sent, segment N sent three times 500-502. Segment N+1 is also sent three times 503-505. Typically, these are broadcast data segments 304, but they can be non-broadcast data segments 304 such as multi-cast or uni-cast data segments 304. When the receiving network node 141 receives the duplicate data segments 501, 502, 504, 505 and the CRC is validated, the receiving network node 141 drops the duplicate segments and only passes one of each individual data segment 500, 501, or 503 and 503, 504, or 505 up to the upper layer for processing. Redundant segment sending can be used in conjunction with sending of acknowledgement segments 303 and the needs of the system. A data segment 304 can be sent with both redundant segment sending and an acknowledgement segment 303. On the other hand, data segments 304 can be sent with redundant segment sending while others use the acknowledgement segment 303.

Figure 5B:
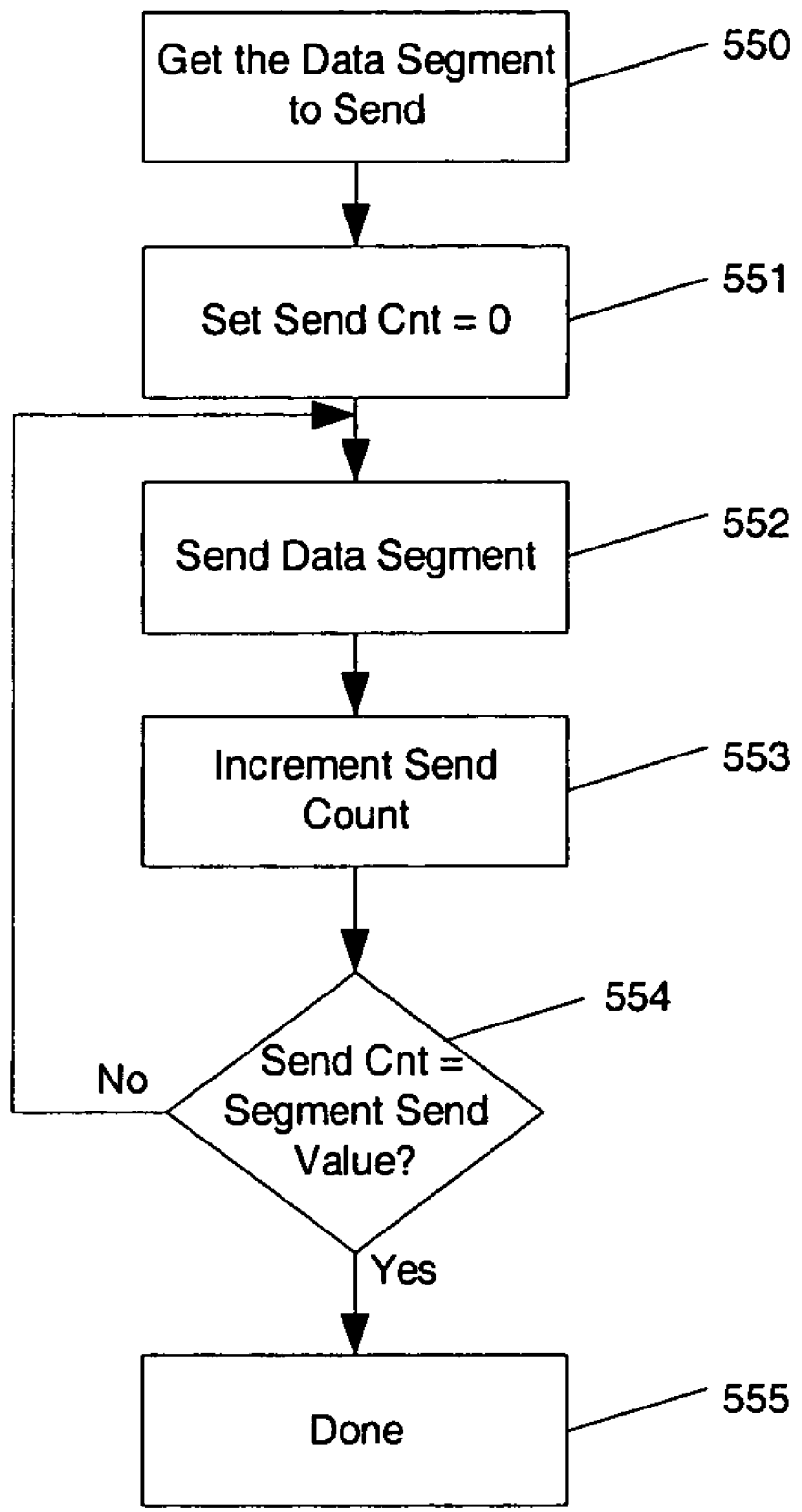
FIG. 5b is a flow diagram of the present preferred process of redundantly sending data segments across a network.

FIG. 5b is a flow diagram of the present preferred process of redundantly sending data segments 304 across a network 142. The process begins by getting 550 a data segment 304 to send. The send count is set 551 to zero. The data segment 304 is then sent 552. The send count is incremented 553. Test 554 checks to see if the send count equals the segment send value. If not, the process goes back to sending the data segment 552. Otherwise, the process ends 555.

Figure 5C:
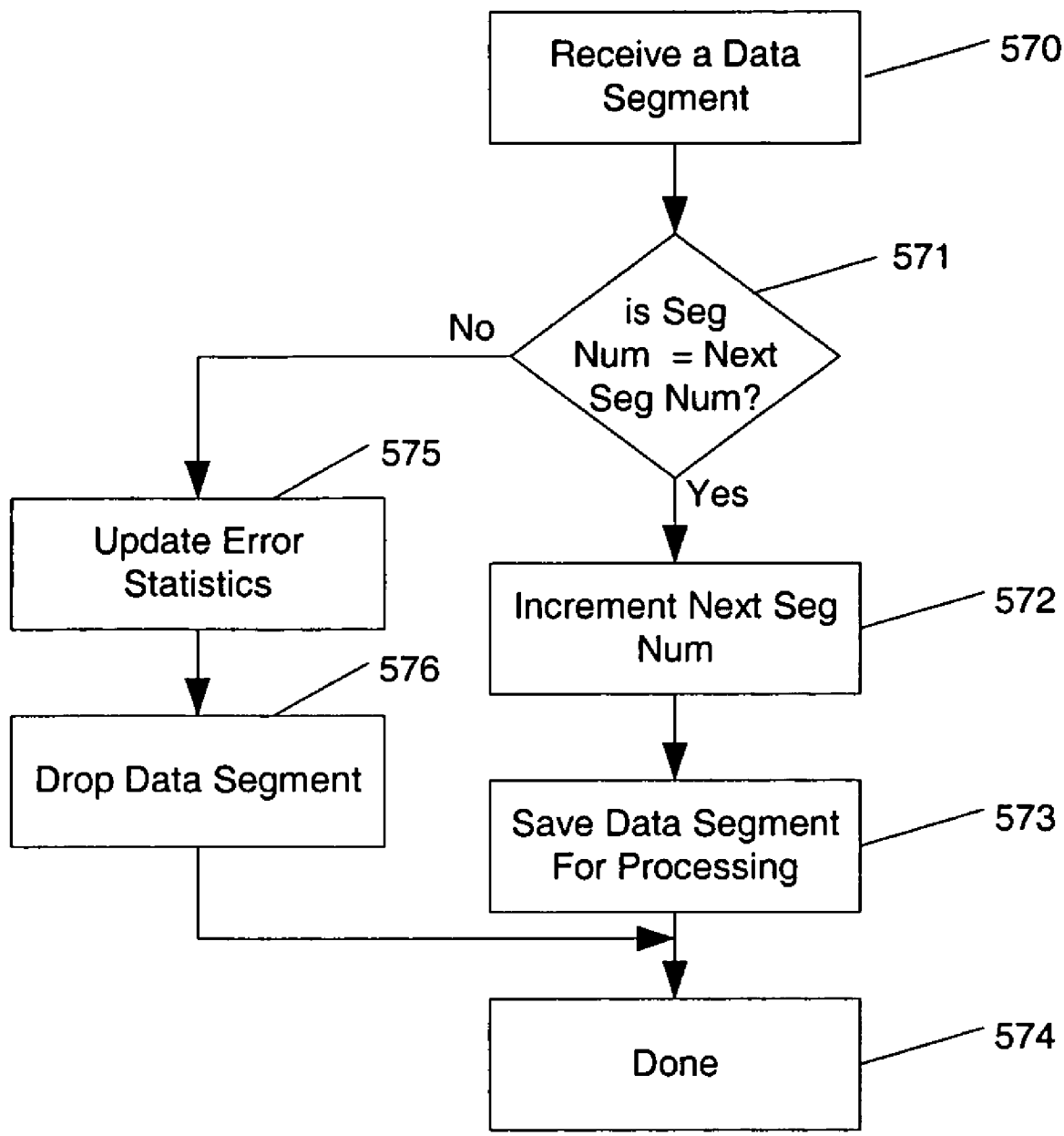
FIG. 5c is a flow diagram of the present preferred process of redundantly receiving data segments across a network.

FIG. 5c is a flow diagram of the preferred process of redundantly receiving data segments 304 across a network 142. The process begins when a data segment 304 is received 570. The process checks in test 571 if the data segment number 207 is equal to the next segment number 207. The next segment number 207 is the number of the data segment 304 that is expected to be received. If the segment numbers 207 are not equal, it means that this is a duplicate data segment 304 or an out of order data segment 304 so the error statistics are updated 575, the data segment 304 is dropped and the process completes 574. Otherwise, if the segment numbers 207 are equal in test 571 the next segment number variable is incremented 572 and the data segment 304 is saved 573 for processing by the next layer and the process completes 574.

Figure 6A:
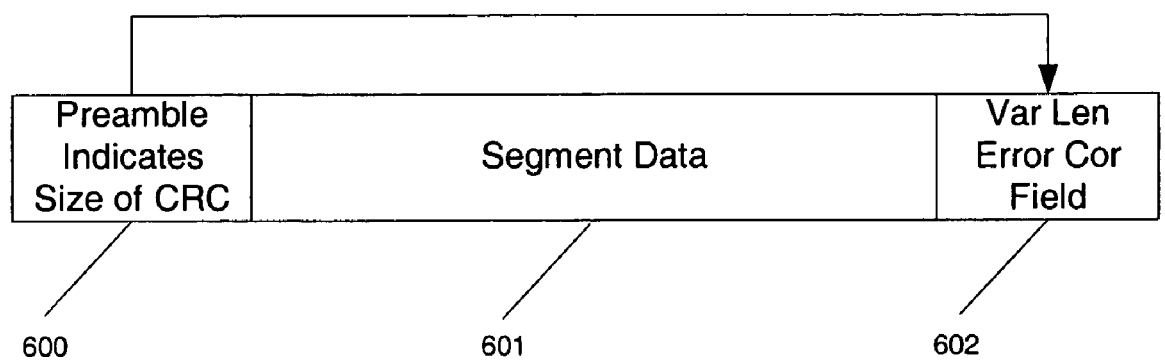
FIG. 6a is a diagram of the present preferred segment structure for dynamic variable length error detection for data and acknowledgement segments.

FIG. 6a is a diagram of the present preferred data segment structure for dynamic variable length error detection for data segments 304. When a data segment 304 is sent on the network 142, the sending network node 140 sends a known preamble 600 which tells the receiving network node 141 where the data segment 304 begins. In the preferred embodiment the preamble 600 is 40 bits in length, but the size of the preamble 600 can be different lengths. Different preambles 600 indicate the size of the variable length error correction field 602 which in the present preferred embodiment is cyclic redundancy check (CRC). In the present preferred embodiment, the preamble 600 of 0×2AA, 0×2AA, 0×25D, 0×03C indicates that a 30 bit variable length error correcting field 602 will follow the segment data 601. A preamble 600 of 0×2AA, 0×2AA, 0×152, 0×3C3 indicates that a 10 bit variable length error correcting field 602 will follow the segment data 601. Other preambles 600 can indicate other types or sizes of CRC, checksums, parity, and the like. The receiving network node 141 looks in the segment data 601 at the segment length field 203 to determine where the end of the segment data 601 is and where the variable length error correcting field 602 starts. Based on the preamble 600, a 10 or 30 bit variable length error correcting field 602 is performed to validate the segment data 601. By sending variable length error checking based on the segment data 601 size, less bandwidth is used when smaller segments are sent thus allowing for a more efficient transfer of data.

Figure 6B:
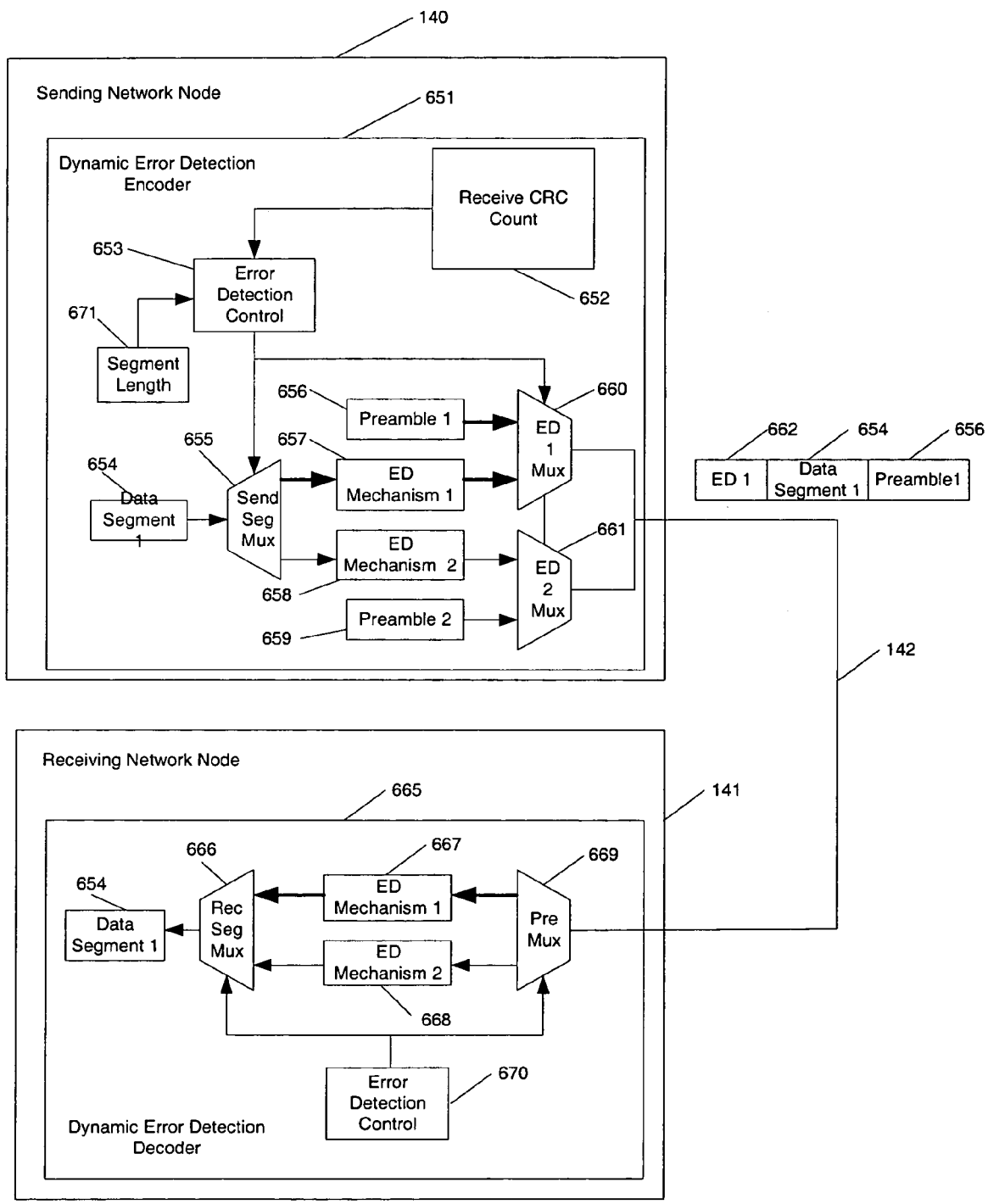
FIG. 6b is a diagram of the present preferred system for generating dynamic variable length error detection for data and acknowledgement segments.

FIG. 6b is a diagram of the preferred system for generating dynamic variable length error detection for data segments 304. The process begins when a sending network node 140 needs to send segment data 1 654. Segment data 1 654 is passed to the dynamic error detection encoder 651. The dynamic error detection encoder 651 keeps a count of Cyclic Redundancy Check (CRC) errors 652 form received data segments 304. This network condition, along with other network conditions such as parity errors, forward error correction errors, and the like are used to select different error detection mechanisms. Based on these errors, the system can dynamically change the type and/or amount of error detection using the error detection control 653 that is used on segment data 1 654. The error detection mechanism can also be controlled by the segment data length 671. In the present preferred embodiment, the acknowledgement segment error detection mechanism (CRC) 402 is 10 bits for acknowledgement segments 303 that are 20 bits or less, and the data segment error detection mechanism (CRC) 302 is 30 bits for data segments 304 that are greater than 20 bits long and up to the maximum data segment length. Segment data 1 654 is sent to the send segment mux 655 which directs segment data 1 654 to the error detection mechanism selected by error detection control 653. In this drawing, error detection 1 657 has been selected. Error detection method 2 658 and its associated preamble 659 may have been selected based on different conditions on the network 142. Error detection method 1 657 is run over segment data 1 654 to produce error detection 1 662. In the preferred embodiment this is a CRC, but can be other error detection mechanisms such as a checksum, parity, and the like. Segment data 1 654 is multiplexed together in error detection 1 mux 660 with error detection 1662 and preamble 1 656 to create the data segment 304 which is 662 and 654 together and associated preamble 656 for sending. The preamble 656 and 659 indicate which type and size of the error detection mechanism is being used on the data segment 304. The data segment 304 which comprises (662 and 654) along with preamble 1 656 are sent from the sending network node 140 across the network 142 to the receiving network node 141. The receiving network node 141 passes the segment data 654 and error detection 1 662 and preamble 1 656 to the dynamic error detection decoder 665. The preamble mux 669 detects which preamble 656 is being used, strips off preamble 1 656, and sends segment data 1 654 with error detection 1 662 to error detection mechanism 1 667. Error detection mechanism 1 667 does an error detection check on segment data 1 654. Segment data 1 654 is routed using receive segment mux 666. The receiving node 141 can take segment data 1 654 and information about any errors in segment data 1 654 from the dynamic error detection decoder 665. Error detection control 670 is used to control which preambles are associated with which error detection mechanism.

Figure 7A:
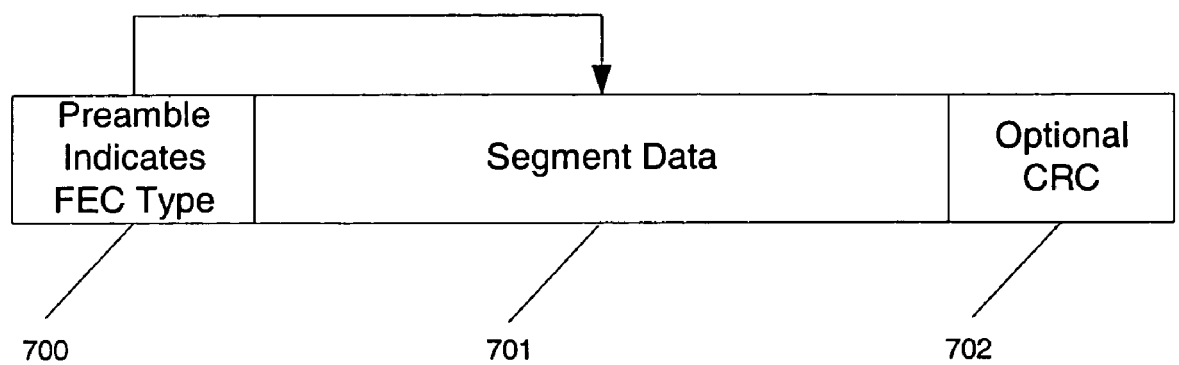
FIG. 7a is a diagram of the present preferred segment structure for dynamic forward error correction on a per segment basis.

In addition to sending variable length error detection in each segment, dynamic forward error correction (FEC) can be sent as well. FIG. 7a is a diagram of the present preferred segment structure for dynamic forward error correction on a per segment basis. The preamble 700 is again used to identify the start of the segment data 701. In this method, the preamble 700 is used to indicate which type of FEC is being used to encode the segment data 701. The preferred embodiment uses a Walsh forward error correction method, but other methods like Hamming codes, Convolutional codes, Reed-Solomon, Low Density Parity Check Codes, Trellis codes, Block Turbo codes, and the like can be used. The preamble 700 can also indicate that there is not a FEC method used to encode the segment data 701. This process can use an optional data segment error detection mechanism (CRC) 702 or some other error detection mechanism. The preamble 700 can be used to indicate both the FEC used to encode the segment data 701 and the length and type of data segment error detection mechanism (CRC) 702. By being able to dynamically change the FEC or turn off FEC on a per data segment 304 basis, the throughput of the system can be increased on networks where less or no FEC is needed due to low error rates on the network 142. A receiving network node 141 can monitor the number of corrected FEC errors and increase or decrease the amount of FEC required dynamically.

Figure 7B:
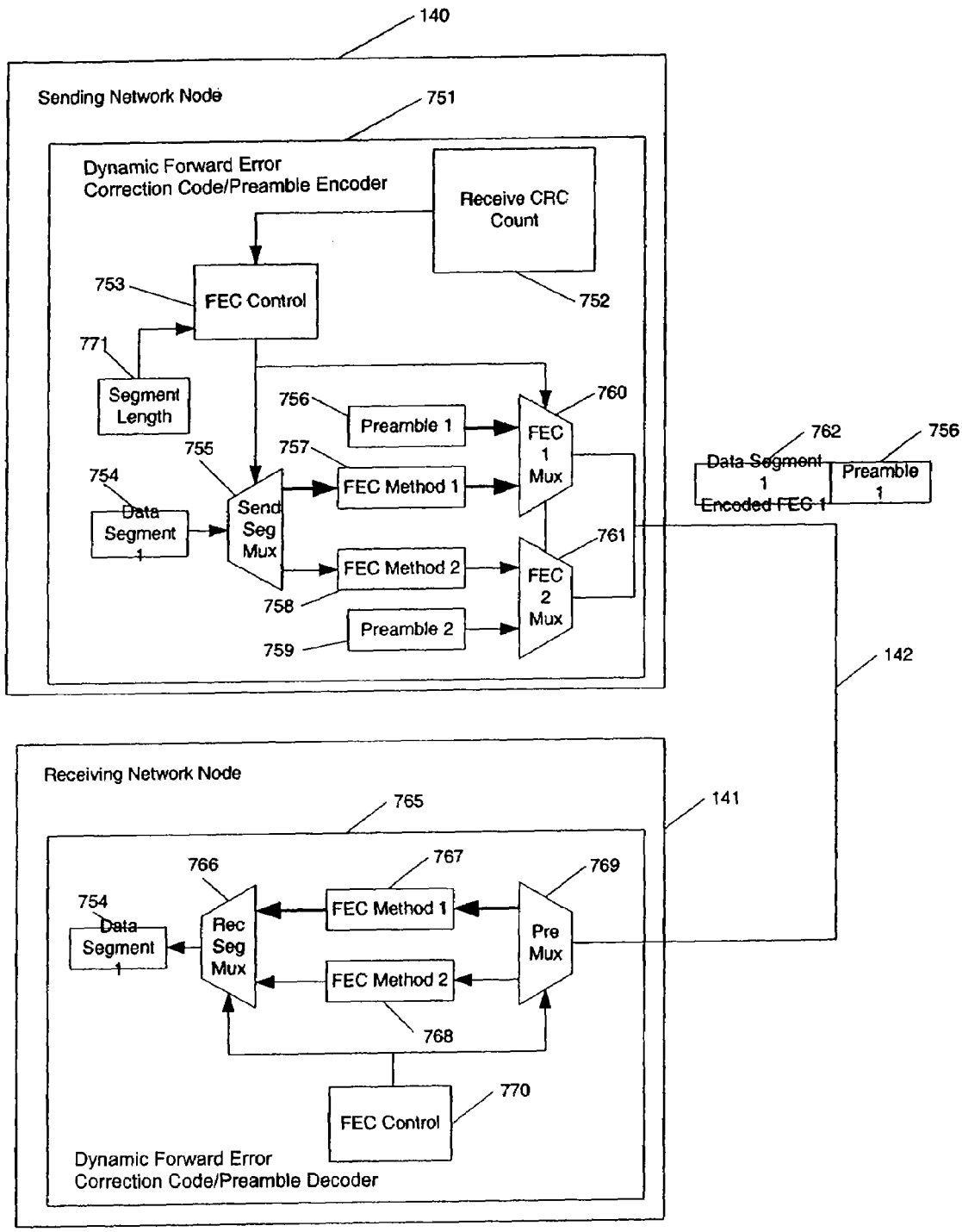
FIG. 7b is a diagram of the present preferred system for generating dynamic forward error correction on a per segment basis.

FIG. 7b is a diagram of the preferred system for generating dynamic forward error correction on a per data segment basis. The process begins when a sending network node 140 wants to send segment data 1 754. Segment data 1 754 is passed to the dynamic forward error correction code/preamble encoder 751 for processing. The dynamic forward error correction code/preamble encoder 751 keeps track of received CRC errors 752 and the data segment 1 length 771. Network conditions such as CRC errors and other network conditions such as forward error correction errors, parity errors, checksum errors, and the like can be used as input to determine the forward error correction mechanism and/or size. This information is used to select which type and/or amount of forward error correction will be used. For example, if there are very few CRC errors, the amount of forward error correction can be reduced, thus allowing for more efficient sending of data across the network 142. In figure 7b, forward error correction method 1 757 has been selected. Forward error correction method 2 and its associated preamble 759 may be selected for the next segment if needed. Segment data 1 754 is passed to forward error correction method 1 for encoding. The encoded data segment 1 762 is multiplexed by FEC 1 mux along with preamble 1 756 so the segment data 1 762 can be sent by the sending network node 140 across the network 142 to the receiving network node 141. The encoded data 762 and the preamble 1 756 are passed from the receiving network node 141 to the dynamic forward error correction code/preamble decoder 765. The preamble mux 769 detects preamble 1, strips off preamble 1 769 and routs the encoded segment data 1 762 to the correct forward error correction mechanism. In this example, forward error correction method 1 767 is to be decoded. After the segment data 1 754 is decoded, the segment data 1 754 is passed to the receive segment mux 766 for routing to the receiving network node 141. The receiving network node can process segment data 1 754 further.

Figure 8:
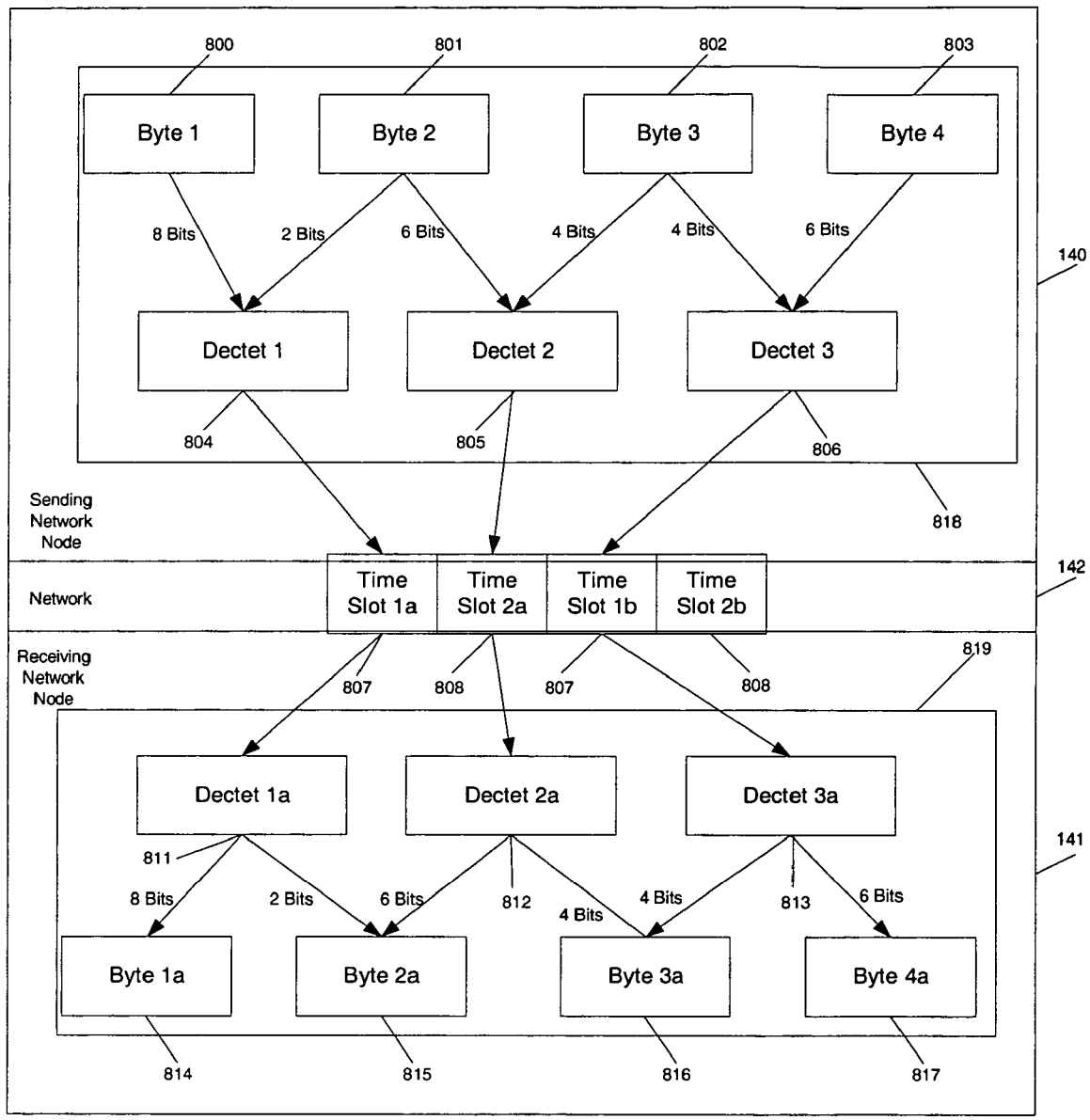
FIG. 8 is a diagram of the present preferred process for converting binary data to non-binary data for use in time slots.

In the present preferred embodiment the time slots 120-136 are 10 bits wide, data must be converted from bytes, words, longs, and the like into 10 bit chunks in order to be sent across a network 142. FIG. 8 is a diagram of the present preferred process for converting binary data to non-binary data for use in time slots 120-135. In the preferred method, the sending network node's 140 transmit data converter 818 takes bytes 800-803 and converts them to dectets 804-806. A dectet is a 10 bit chunk of data which is used to fill up a time slot 807-810. The preferred embodiment uses dectets, but the bytes can be converted to some other non binary format such as 7 bits, 11 bits, and the like sizes for transfer in like time slot sizes. To make dectets 804-806, the bytes 800-803 are broken up to make the larger dectets 804-806. The dectets 804-806 are put in time slots 807 and 808. FIG. 8 depicts the time slots 1a and 1b 807 and time slots 2a and 2b 808 as the same time slot over time. The time slots 807-808 transfer the data across the network 142 to the receiving network node 141. The receiving network node's 141 receiving data converter 819 takes each dectet out of the time slots 807-813 and converts them back to into bytes 814-817. The bytes are passed up to the next layer for processing on the receiving network node 141.

Figure 9:
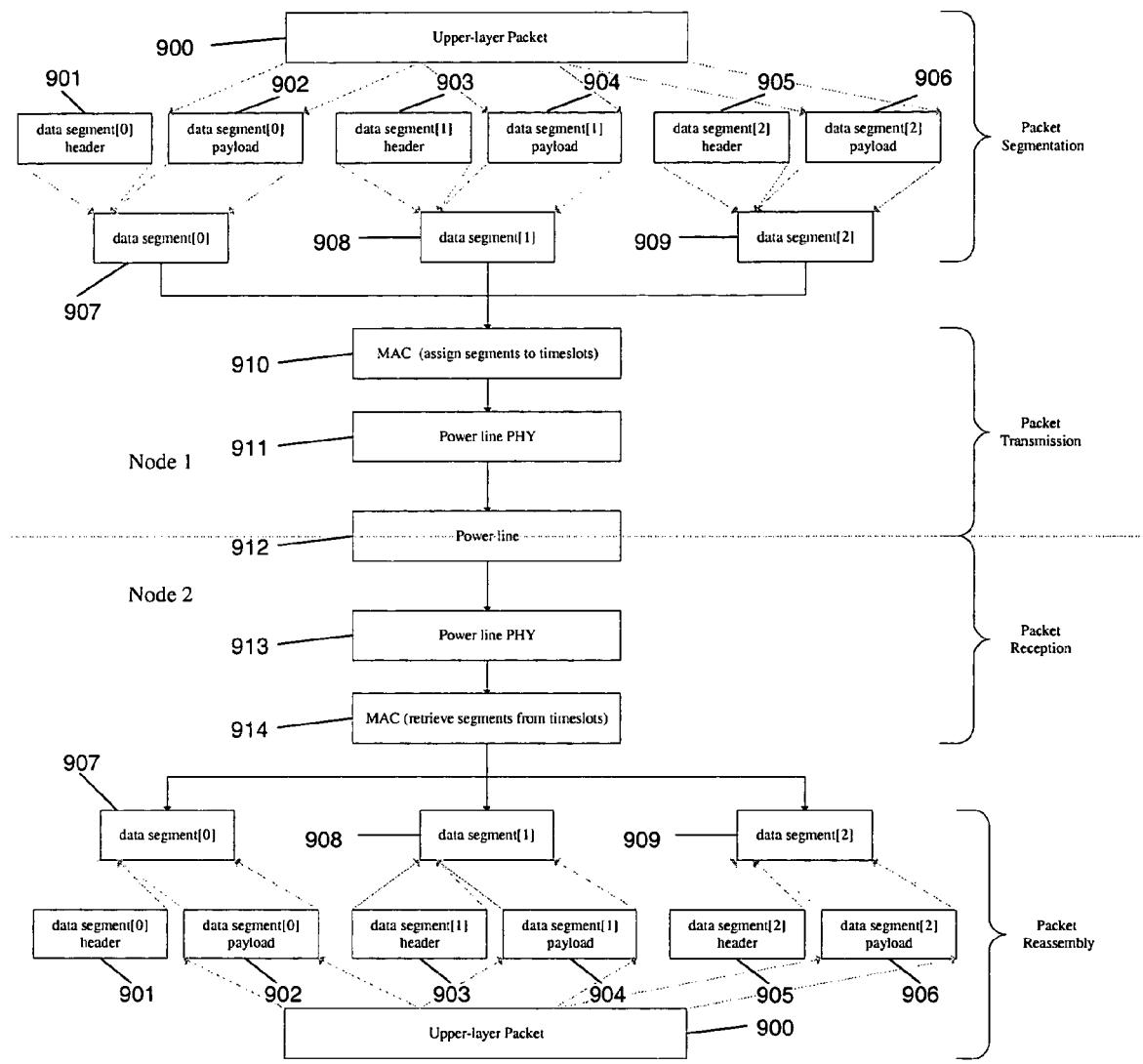
FIG. 9 is a flow diagram of the present preferred process for packet segmentation and packet reassembly.

FIG. 9 is a flow diagram of the present preferred process for packet segmentation and packet reassembly. When an upper layer packet 900 is ready to transmit across the network 142, the upper layer packet 900 is broken up into smaller segment payloads 902, 904, and 906 by the sending network node 140. The data segment payloads 902, 904, and 906 are matched with sequenced data segment headers 901, 903, and 905 to form data segments 907-909. The sequenced data segments 907-909 are passed to the Media Access (MAC) layer 910 which puts the data segments 907-909 into the time slots 120-135 which constitute an active channel. The data segments 907-909 are passed to the power line physical layer 911 and sent across the power line 912 (network 142). This can also be another physical layer such as wireless, light frequency and wired. The data segments 907-909 are received by the receiving network node's physical layer 913 and passed to the MAC layer 914. The MAC layer 914 retrieves the data segments 907-909 from the time slots 120-135 which form the active channel. The segments 907-909 are converted back into the segment headers 901, 903, and 905 and segment payloads 902, 904, and 906. Once the data segments 907-909 are validated and are in sequence, they are converted back into the upper layer packet 900. The upper layer packet is passed on to the next layer for processing. This process works the same for broadcast, multi-cast, or uni-cast packets.

Figure 10:
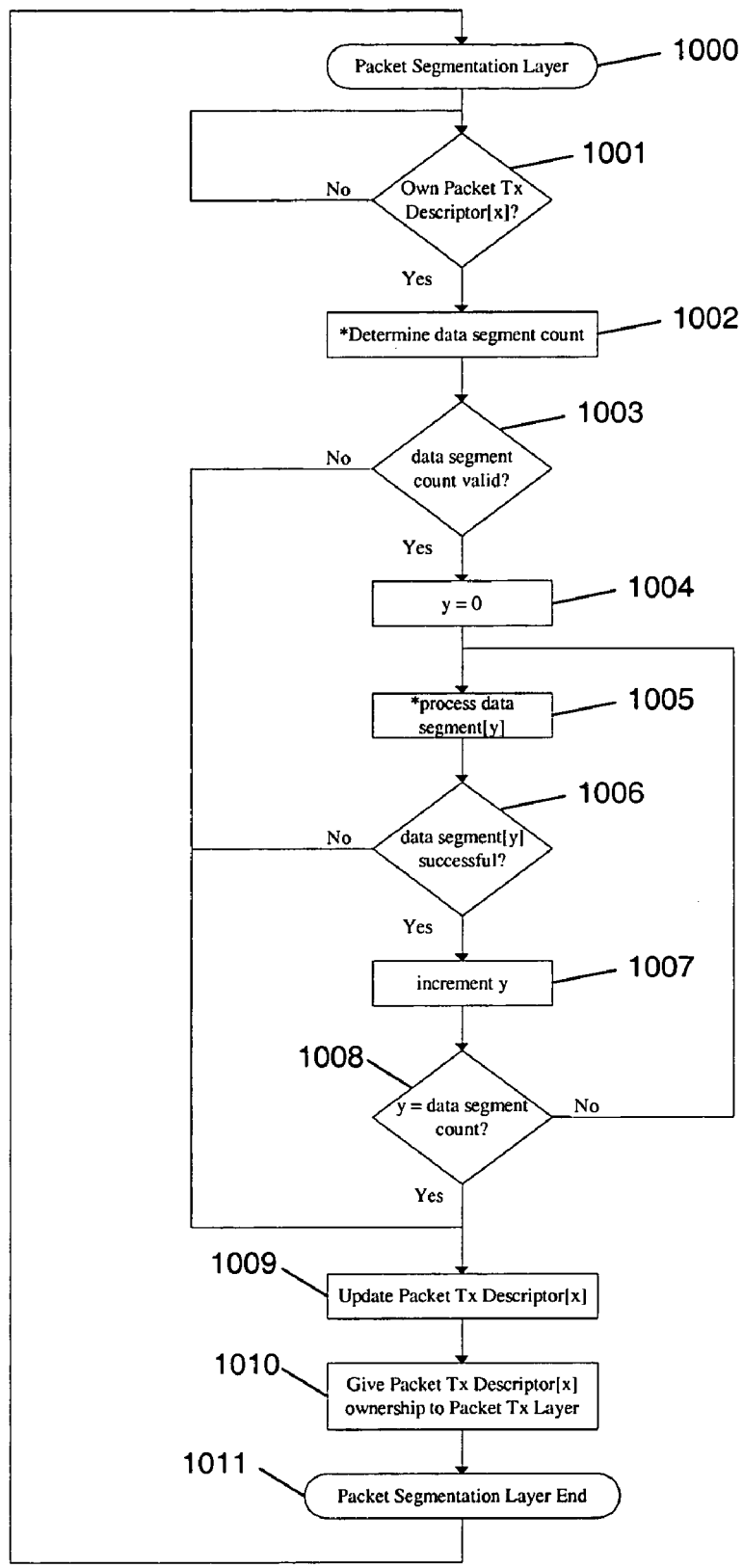
FIG. 10 is a flow diagram of the present preferred main packet segmentation layer algorithm.

FIG. 10 is a flow diagram of the present preferred main packet segmentation layer algorithm. When an upper layer packet 900 is ready for sending, the process begins 1000. The sending network node 140 checks to see if owns the transmit descriptor 1001 in order to process the upper layer packet 900 and break the upper layer packet 900 into segments 304. The transmit packet descriptor contains information about the upper layer packet 900 which allows the sending network node 141 to process and send the upper layer packet 900. Below is a list of information contained within the transmit packet descriptor:

1) Ownership—Identifies which layer still has the ability to modify the descriptor.

2) Buffer Address—The address of the upper layer packet in memory.

3) Segment Offset—A number indicating how many bytes of the segment have been segmented.

4) Active Channel ID—Identifies the active channel the upper layer packet is to be transmitted in.

5) Destination Network Address—The address of the destination network.

6) Destination Node Address—The destination address of the node for which the segment is being sent.

7) Source Network Address—The network address of the sending network node.

8) Source Node Address—The source node address.

9) Packet ID—A unique identifier for the upper layer packet.

10) Packet Length—The number of bytes in the upper layer packet.

11) Socket—The socket number pertaining to the upper layer packet.

12) Cipher Flag—Flag is set if the upper layer packet's segments are to be encrypted.

13) Acknowledgement Type—Specifies the acknowledgement protocol used for each segment that is a part of the upper layer packet.

14) Transmit Attempts—The number of transmit attempts that are allowed for each segment of the upper layer packet.

If at test 1001 the process owns the descriptor, the process flows to 1002. Otherwise, the process waits till the upper layer grants the process ownership of the descriptor. The node determines 1002 the segment count. The process for determining the segment count 1002 is further defined in FIG. 11. Test 1003 checks to see if the segment count is valid. If not, the process updates 1009 the packet transmit descriptor. If test 1003 is yes the loop variable y is set 1004 to zero. Variable y is used to count how many data segments 304 have been created. The data segment 304 is processed 1005. Step 1005 is further refined in FIG. 12. If the data segment 304 was successfully created 1006, the process increments 1007 variable y to indicate the creation of another data segment 304. Otherwise, the packet descriptor is updated 1009. Test 1008 checks to see if all the data segments 304 for this upper layer packet 900 have been processed. If so, the packet transmit descriptor is updated 1009. Otherwise, the segment is processed 1005. In step 1009, the transmit packet descriptor is updated and ownership is given back to the packet transmit layer. This can be done because the data segments 304 are sent and the memory in the descriptor is no longer needed.

Figure 11:
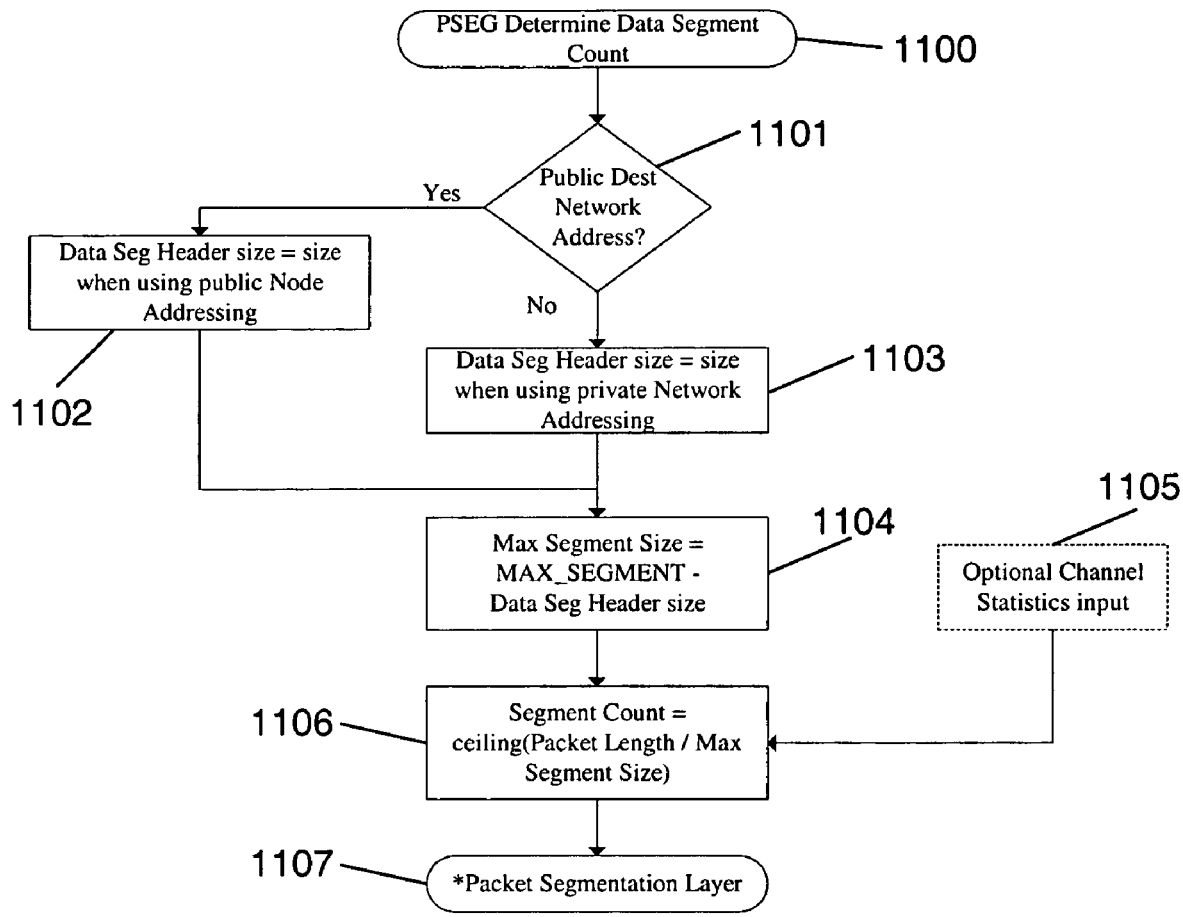
FIG. 11 is a flow diagram of the present preferred packet segmentation algorithm used to determine the required segment count.

FIG. 11 is a flow diagram of the present preferred packet segmentation algorithm used to determine the required segment count. FIG. 11 is a detailed flow diagram of step 1002. The process begins 1100. In test 1101, the process checks to see if the destination address is public or private. In the present preferred embodiment, there are two modes of addressing public and private. Public addressing is used when a network node 140 or 141 is first introduced and added to a secure network 142. After being added to a secure (encrypted) network 142, the network node 140 or 141 becomes private when it communicates with other network nodes 140, 141 on the private network 142. It still may talk to nodes using the public addressing. Public addressing requires a larger segment header size to accommodate full addressing. The process will work with private addressing for all nodes as well. If at test 1101 the address is public, the header size is set for public addressing 1102 which uses the node address and the public network address. Otherwise, the data segment length 203 is set for private addressing 1103 using only node's logical network address. The data segment length 203 is set 1104 to the max segment size minus the data segment header length 203. The data segment count is determined 1106 by dividing the upper layer packet 600 length by the maximum data segment size. The data segment length 203 and other information in this process 1106 can be influenced by channel statistics 1105 such as error rates for the channel, and the like. The process completes 1107.

Figure 12:
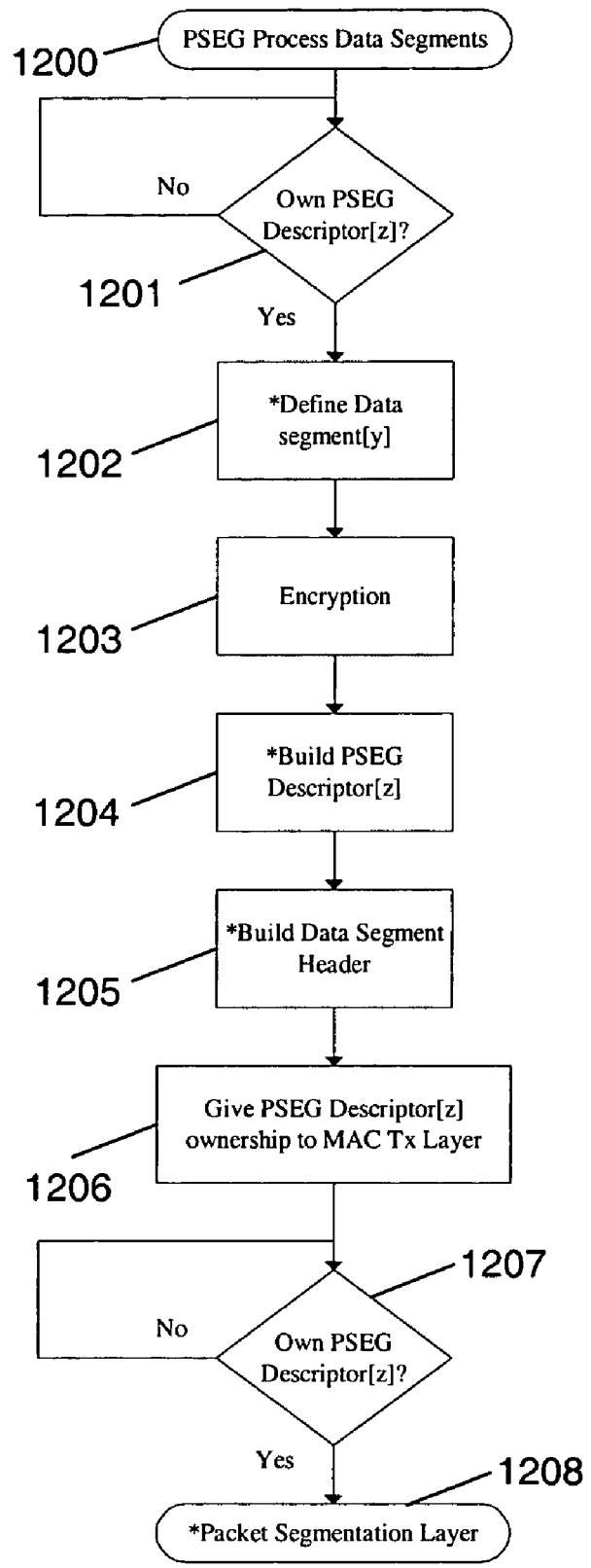
FIG. 12 is a flow diagram of the present preferred algorithm for processing segments for transmission.

FIG. 12 is a flow diagram of the preferred algorithm for processing data segments 304 for transmission. FIG. 12 is a detailed flow diagram of step 1005. The process begins 1200. Test 1201 checks to see if the process owns the packet segmentation (PSEG) descriptor. The PSEG descriptor is used to keep track of each data segment 304 and its associated information so the data segment 304 can be sent successfully. The following list contains the information contained in the PSEG descriptor:

1) Ownership—Identifies which layer still has the ability to modify the descriptor.

2) Segment Header Buffer Address—The address in memory of the data segment header 214 for a data segment 304.

3) Segment Buffer Address—The address of the buffer containing the data segment 304 to transmit.

4) Channel ID—Identifies the active channel the segment is to be transmitted in.

5) Destination Network Address—The address of the destination network.

6) Destination Node Address—The destination address of the node for which the segment is being sent.

7) Source Network Address—The network address of the sending network node 141.

8) Source Node Address—The source node address.

9) Packet ID—A unique identifier for the upper layer packet 900.

10) Segment ID—A unique identifier for a data segment 304.

11) Segment Payload Length—The number of bytes in the data segment payload 301.

12) Socket—The socket number pertaining to the data segment 304.

13) Cipher Flag—Is set if the data segment 304 is to be encrypted.

14) Acknowledgement Type—Specifies the acknowledgement protocol used for the data segment 304.

15) Transmit Attempts—The number of transmit attempts that are allowed for each data segment 304 of the upper layer packet 900.

16) Payload Checksum—A checksum of the segment payload 301 data before any encryption is performed.

17) Status—The status of the transmit data segment 304 (i.e. has it been sent and the like).

If in test 1201 the process owns the PSEG descriptor, the process goes on and defines 1202 the data segment 304. Otherwise, the process waits in test 1201 until the process receives ownership. In step 1202 the data segment 304 is defined. The process of how the data segment 304 is defined 1202 is shown in greater detail in FIG. 13. The data segment 304 is encrypted 1203 if necessary. A packet segment (PSEG) descriptor is built 1204 for the data segment 304. The process of how the descriptor is build 1204 is shown in greater detail in FIG. 14. The data segment header 214 is built 1205. How the data segment header 214 is build 1205 is shown in greater detail in FIG. 15. The PSEG descriptor is given 1205 to the MAC transmit layer to send the 304 segment on the network. The process waits in test 1207 for ownership of the PSEG descriptor to transfer back. Ownership will transfer back when the MAC layer transmits the data segment 304 and the process completes 1208.

Figure 13:
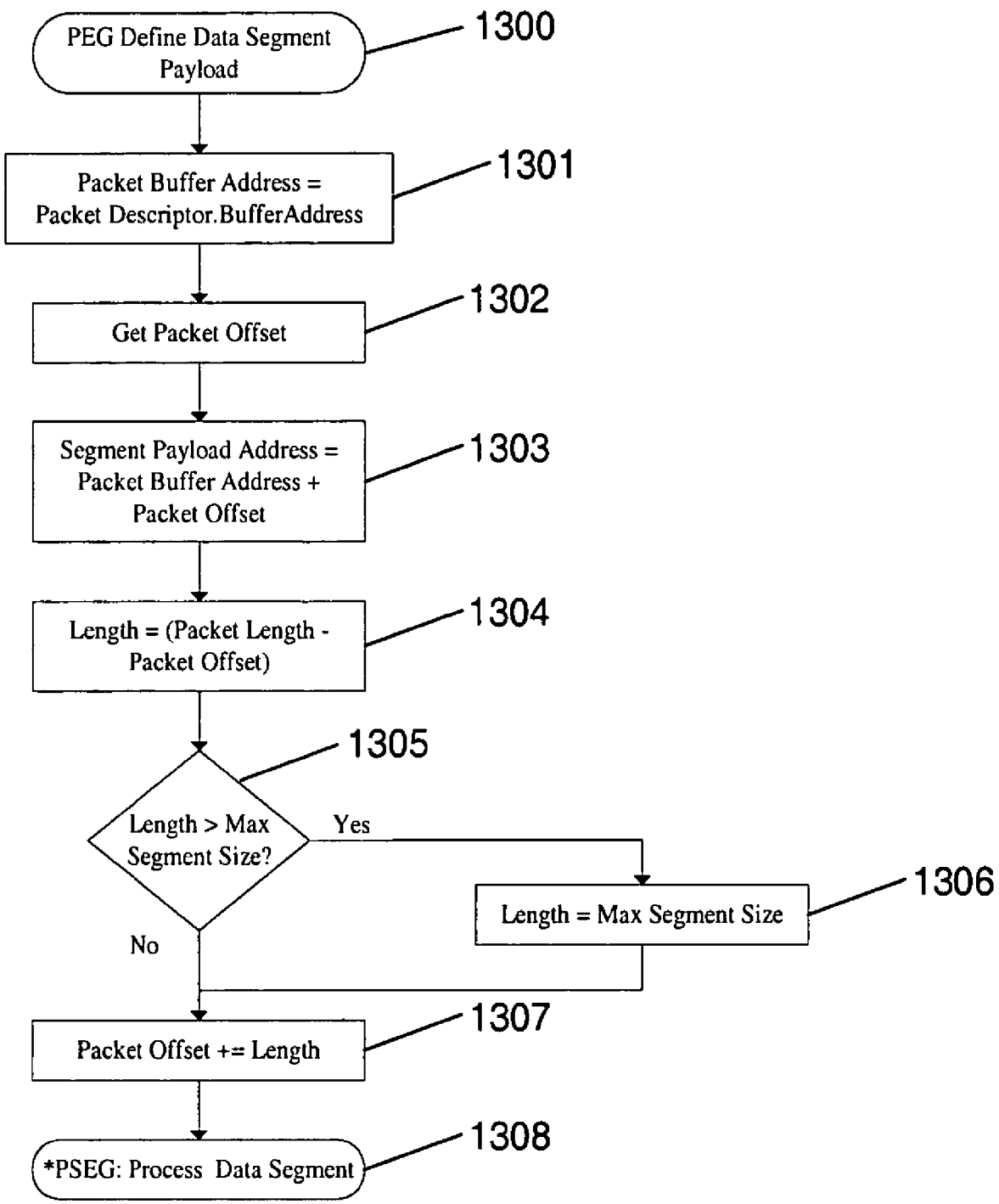
FIG. 13 is a flow diagram of the present preferred algorithm to define the segment payloads.

FIG. 13 is a flow diagram of the preferred algorithm to define the segment payload 301. It is also a detailed flow diagram of step 1202. The process begins 1300. In step 1301 the packet buffer address is set equal to the packet descriptor buffer address. The offset into the packet is retrieved 1302 which is a pointer to where the data segment 304 begins in the upper layer packet 900. The data segment payload address is calculated 1303 by taking the packet buffer address plus the packet offset. The data segment length is calculated 1304 by subtracting the packet offset from the upper layer packet length. If in test 1305 the segment length is greater than the maximum segment size the length is set 1306 to the maximum segment size. The data segment length is added 1307 to the packet offset. This is so the offset can be used to calculate the next data segment 304. The process ends 1308.

Figure 14:
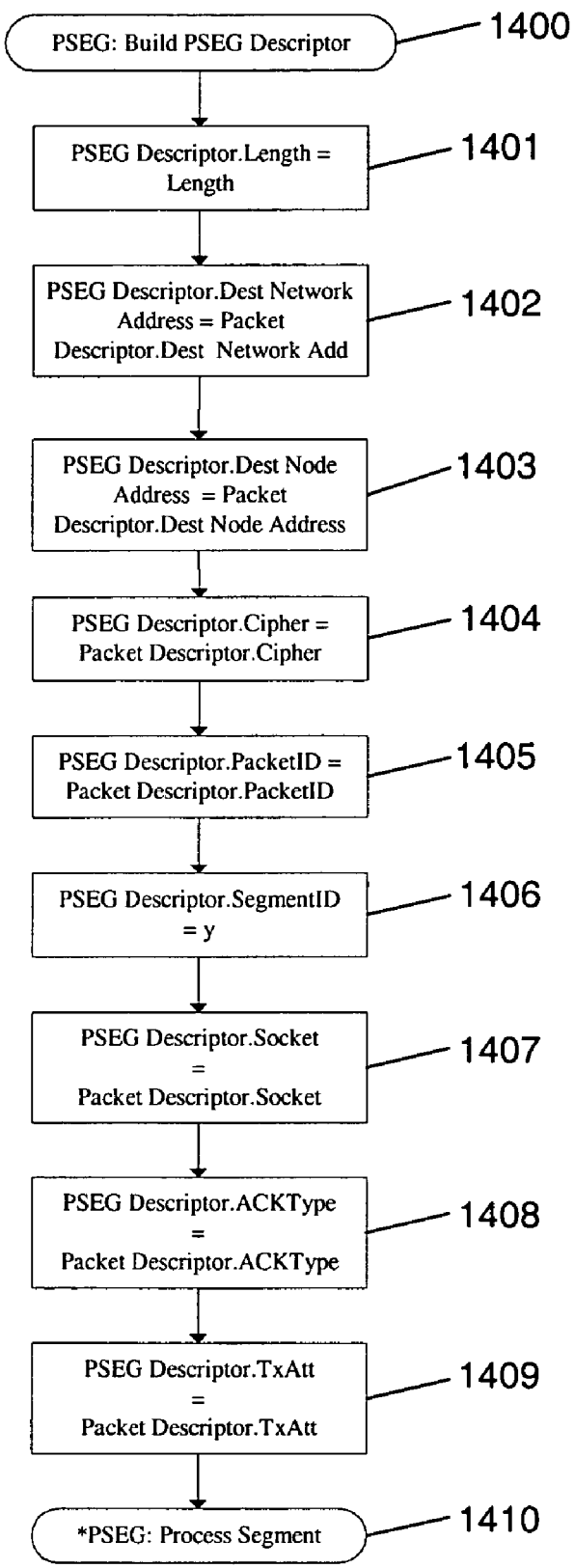
FIG. 14 is a flow diagram of the present preferred process for building the packet segment descriptor prior to giving the segment to the Media Access layer.

FIG. 14 is a flow diagram of the present preferred process for building the packet segment descriptor prior to giving the segment to the Media Access layer. It is also a detailed flow diagram of step 1204. The process begins 1400. The packet segment (PSEG) descriptor length is set equal to the segment length 1401. The PSEG descriptor destination network address is set 1402 equal to the packet descriptor destination network address. The PSEG descriptor destination node address is set 1403 equal to the packet descriptor destination node address. The PSEG descriptor cipher flag is set 1404 equal to the packet descriptor cipher flag. The PSEG descriptor packet ID is set 1405 equal to the packet descriptor packet ID. The PSEG descriptor is set 1406 equal to the variable y. The variable y is a unique identifier for the data segment 304. The PSEG descriptor socket is set equal 1407 to the packet descriptor socket. The PSEG descriptor acknowledgement type is set 1408 equal to the packet descriptor acknowledgement type. The PSEG descriptor transmit attempts is set 1409 equal to the packet descriptor transmit attempts. The process completes 1410.

Figure 15:
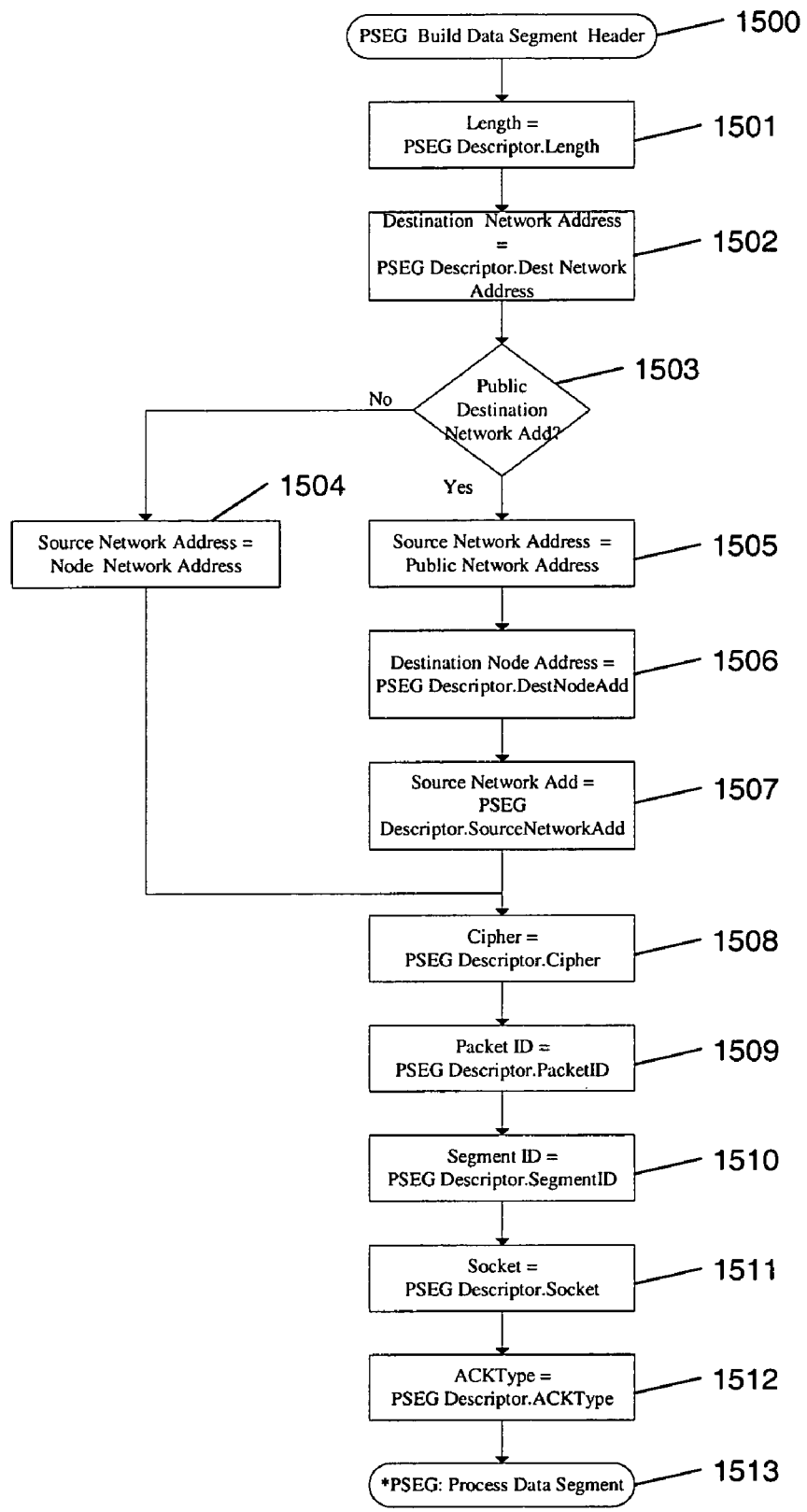
FIG. 15 is a flow diagram of the present preferred process for creating the Media Access header.

FIG. 15 is a flow diagram of the preferred process for creating the data segment header 214. It is also a detailed flow diagram of step 1205. This process builds the data segment header 214 which is attached to the segment payload 301 so it can be sent across the network 142. The data segment header 214 is defined in FIG. 2. The process begins 1500. The data segment header length 203 is set 1501 equal to the PSEG descriptor length. The data segment header destination network number 213 is set 1502 equal to the PSEG descriptor destination network address. Test 1503 checks to see the destination network address is a public or private address. If the address is public in test 1503, the data segment header source network number 209 is set 1505 to the public network address. Otherwise, the data segment header source network number 209 is set 1504 to the node's network address and the process sets 1508 the encryption field 206 to the PSEG cipher flag. After setting 1505 the data segment header source network number 209 to the public address, the data segment header destination node number 213 is set 1506 equal to the packet segment descriptor destination node address. The data segment header source node number 212 is set 1507 equal to the packet segment descriptor source node address. The Data segment header encrypt field 206 is set 1508 equal to the packet segment descriptor cipher flag. The data segment header packet number 211 is set 1509 equal to the PSEG descriptor packet ID. The data segment header segment number 207 is set equal to the packet descriptor segment ID. The data segment header socket 202 is set 1511 equal to the PSEG descriptor socket. The data segment header ARQ field 208 is set 1512 equal to the PSEG descriptor acknowledgement type and the process completes 1513.

Figure 16:
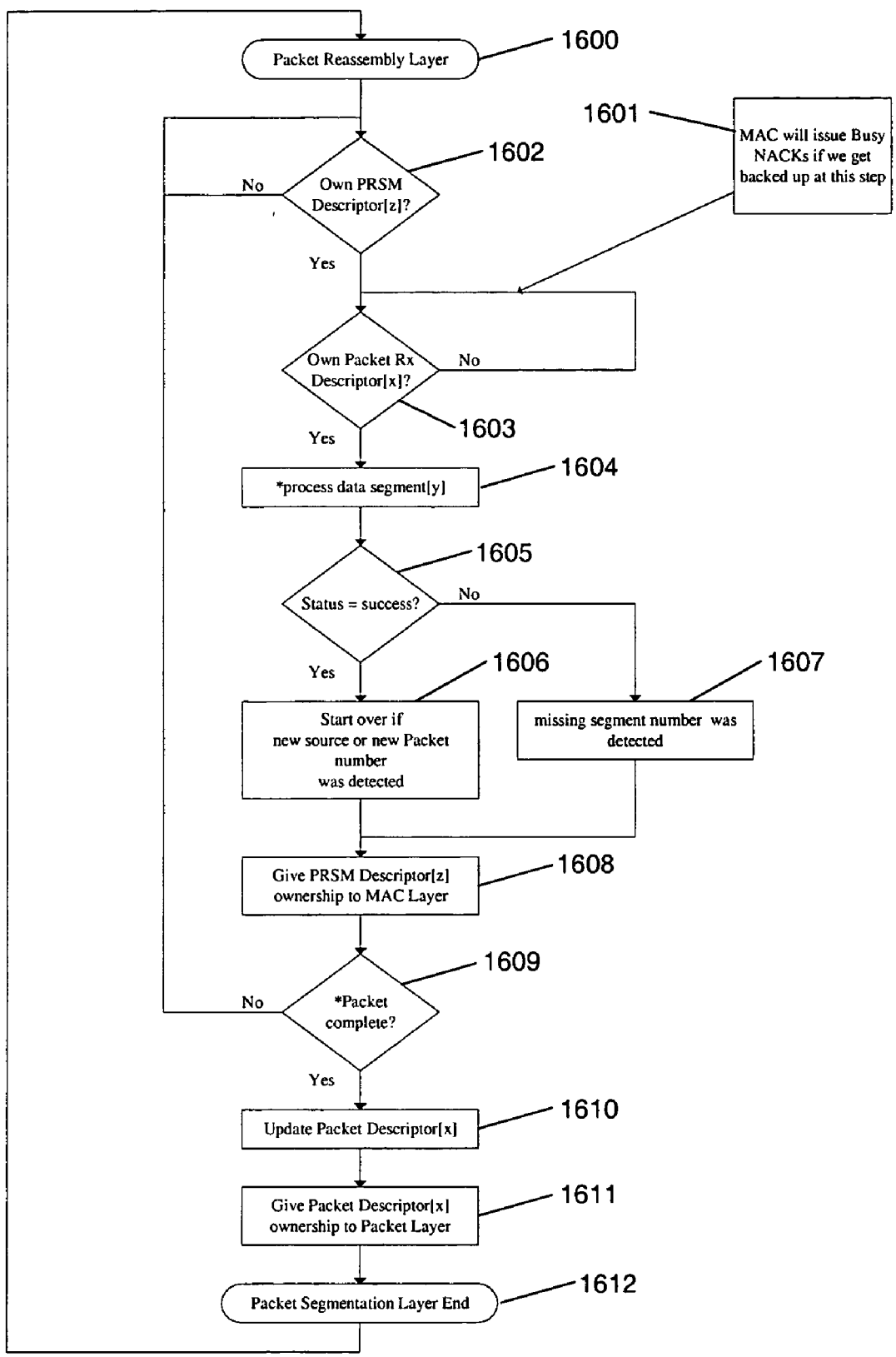
FIG. 16 is a flow diagram of the present preferred upper layer packet reassembly algorithm.

FIG. 16 is a flow diagram of the present preferred upper layer packet 900 reassembly algorithm. The process begins 1600 which is initiated by the reception of a data segment 304. Test 1602 looks to see if the Packet Reassembly (PRSM) layer owns the descriptor. If not the process waits until the descriptor before available for use by the packet reassembly layer. The PRSM descriptor contains the information about each data segment 304 so the information can be used to reassemble the upper layer packet 900. The PRSM descriptor contains the following fields:

1) Ownership—Identifies which layer still has the ability to modify the descriptor.

2) Data segment header Buffer Address—The address of the buffer containing the receive data segment header 214.

3) Segment Buffer—Address of the buffer containing the receive data segment 304.

4) Channel ID—Identifies the active channel that the data segment 304 was received in.

5) Source Network Address—The network address of the sending network node 140.

6) Source Node Address—The source node address.

7) Packet ID—A unique identifier for the upper layer packet 900.

8) Segment ID—A unique identifier for the data segment 304.

9) Payload Length—The number of bytes in the data segment payload 301.

10) Socket—The socket number pertaining to the data segment 304.

11) Cipher Flag—Flag is set if the data segment 304 is encrypted.

12) Acknowledgement Type—Specifies the acknowledgement protocol used for the data segment 304.

13) Payload Checksum—Checksum of the data segment payload 301 data after any decryption is performed.

If in test 1602 the process owns the PRSM descriptor, the process checks to see if the process owns the packet receive descriptor in test 1603. Otherwise, the process waits in test 1602 until PRSM descriptor is owned. The packet receive descriptor contains buffers and information to create the upper layer packet. The packet receive descriptor contains the following fields:

1) Ownership—Identifies which layer still has the ability to modify the descriptor.

2) Packet Buffer—Address of the buffer containing the reassembled upper layer packet.

3) Segment Offset—A number indicating how many bytes of the upper layer packet 900 have been reassembled.

4) Channel ID—Identifies the active channel that the upper layer packet was received in.

5) Source Network Address—The network address of the sending network node 140.

6) Source Node Address—The source node address.

7) Packet IDA unique identifier for the upper layer packet 900.

8) Packet Length—The number of bytes in the upper layer packet 900.

9) Socket—The socket number pertaining to the upper layer packet 900.

10) Cipher FlagFlag is set if the upper layer packet 900 was encrypted.

11) Redundant Segment Count—The number of redundant segments received while processing the packet.

12) CRC Error Count—The number of CRC errors which occurred while processing the upper layer packet 900.

13) Segment Mask—This field is used to mask bits which allows the process to keep track of the last data segment 304 received.

If the process does not own the packet receive buffer in test 1603, it will wait until one is freed for the process to use. The process may send a negative acknowledgement packet 1601 to indicate that the receiving network node 141 is backed up and cannot process the data segment 304 immediately. Once the process owns a packet receive buffer, data segments 304 are processed 1604. Step 1604 is defined in further detail in FIG. 17. If in test 1605 the data segment 304 was received successfully the process checks to see if a new source network number 204 and source node number 212, or packet number 211 were detected 1606. If so a new process is started to reassemble the new upper layer packet 900. If test 1605 was not successful, the process checks for missing data segments 304 so the process can keep track of the missing data segments 304 later 1607. Ownership of the PRSM descriptor is returned 1608 to the MAC layer for handling additional data segments 304 because processing of the data segment 304 is complete. Test 1609 checks to see if all the data segments 304 in the upper layer packet 900 have been received. If all the data segments 304 have not been received, the process checks to see if the process owns 1602 a PRSM descriptor. If the upper layer packet 900 has been fully received in test 1609, the packet receive descriptor is updated 1610 to indicate that the packet is complete. The packet receive descriptor's ownership is changed 1611 so the upper layer can process the upper layer packet 900. The process for that upper layer packet 900 completes 1612. The process repeats for the next upper layer packet 900 to reassemble 1600.

Figure 17:
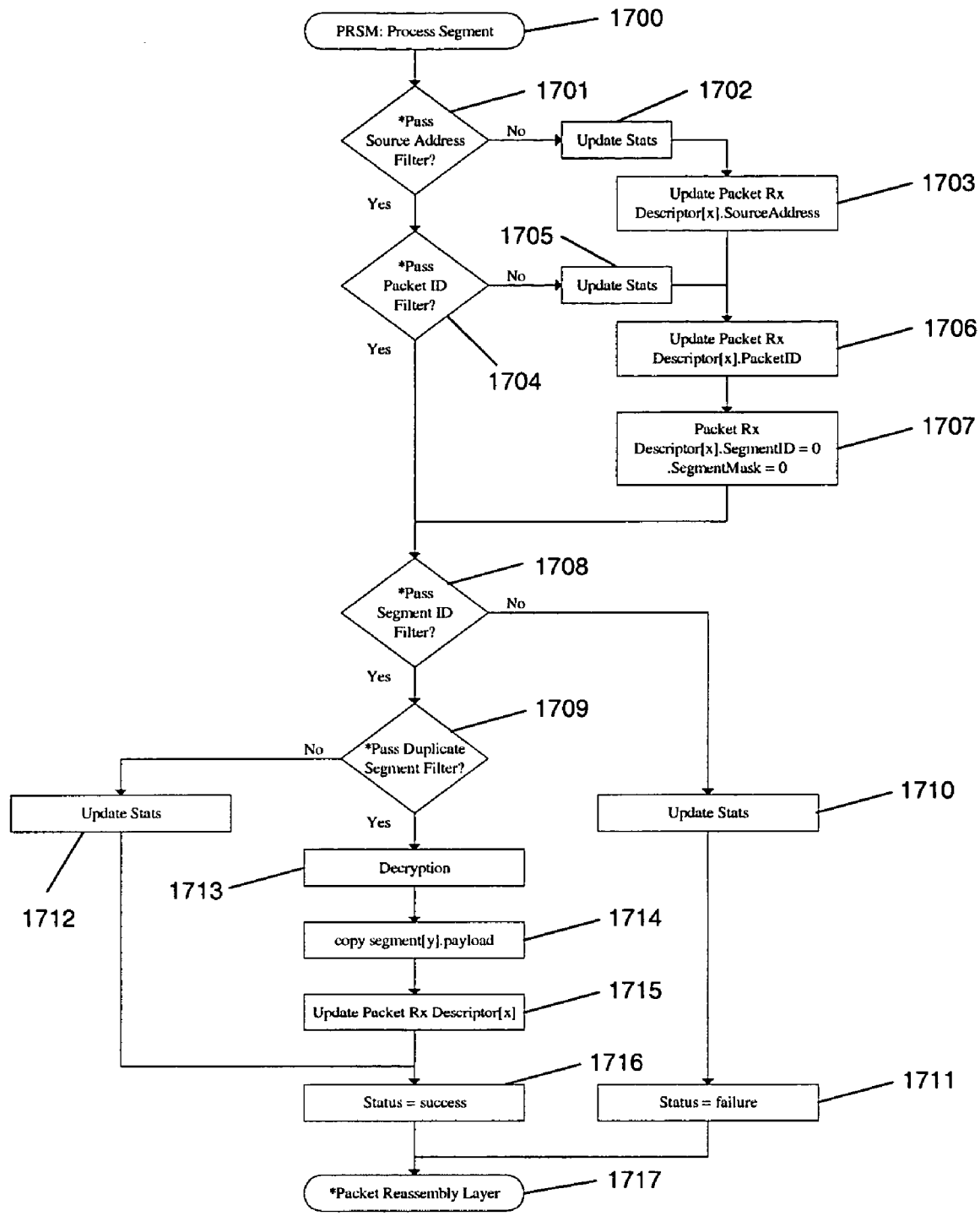
FIG. 17 is a flow diagram of the present preferred filtering and data manipulation steps required to reassemble an upper layer packet from data segments.

FIG. 17 is a flow diagram of the preferred filtering and data manipulation steps required to reassemble an upper layer packet 900 from data segments 304. FIG. 17 is a detailed flow diagram of step 1604. The process begins 1700. In test 1701 the process checks to see if the data segment 304 passes the source address filter. Test 1701 is shown in further detail in FIG. 18. If so, the process goes on to test 1704. Otherwise, the data segment 304 statistics are updated 1702. The receive packet descriptor is updated with the source address of the data segment 1 703 and the process goes to step 1706. In test 1704 if the packet ID filter test fails, the data segment 304 statistics are updated 1705. Test 1704 is further defined in FIG. 19. The packet receive descriptor is updated 1706 with the packet number 211. The packet receive descriptor segment ID is set 1707 to 0 along with the data segment mask and the process goes to test 1708. If in test 1704 the data segment 304 passes the ID filter, the process also goes to test 1708. Test 1708 is further defined in FIG. 20. If in test 1708 the data segment 304 does not pass the segment ID filter algorithm the data segment 304 statistics are updated 1710, the status is set 1711 to failure, and the process completes 1717 by returning a failure status. Otherwise, if test 1708 passes the segment ID filter algorithm, the process goes to test 1709. Test 1709 is further defined in FIG. 21. Test 1709 checks to see if the data segment 304 is a duplicate of a previous data segment 304. If the data segment 304 passes the duplicate data segment filter test 1709, the process decrypts 1713 the data segment 304 if it was encrypted. Otherwise, if the data segment 304 is a duplicate, the data segment 304 statistics are updated 1712 and the process sets 1716 the status to success. Once the data segment is decrypted 1713, the data segment payload 301 is copied 1714 to the packet receive descriptor packet buffer. The packet receive descriptor is updated 1715 with the new information. Status is set 1716 to success. The process completes by returning 1717 a success or failure status.

Figure 18:
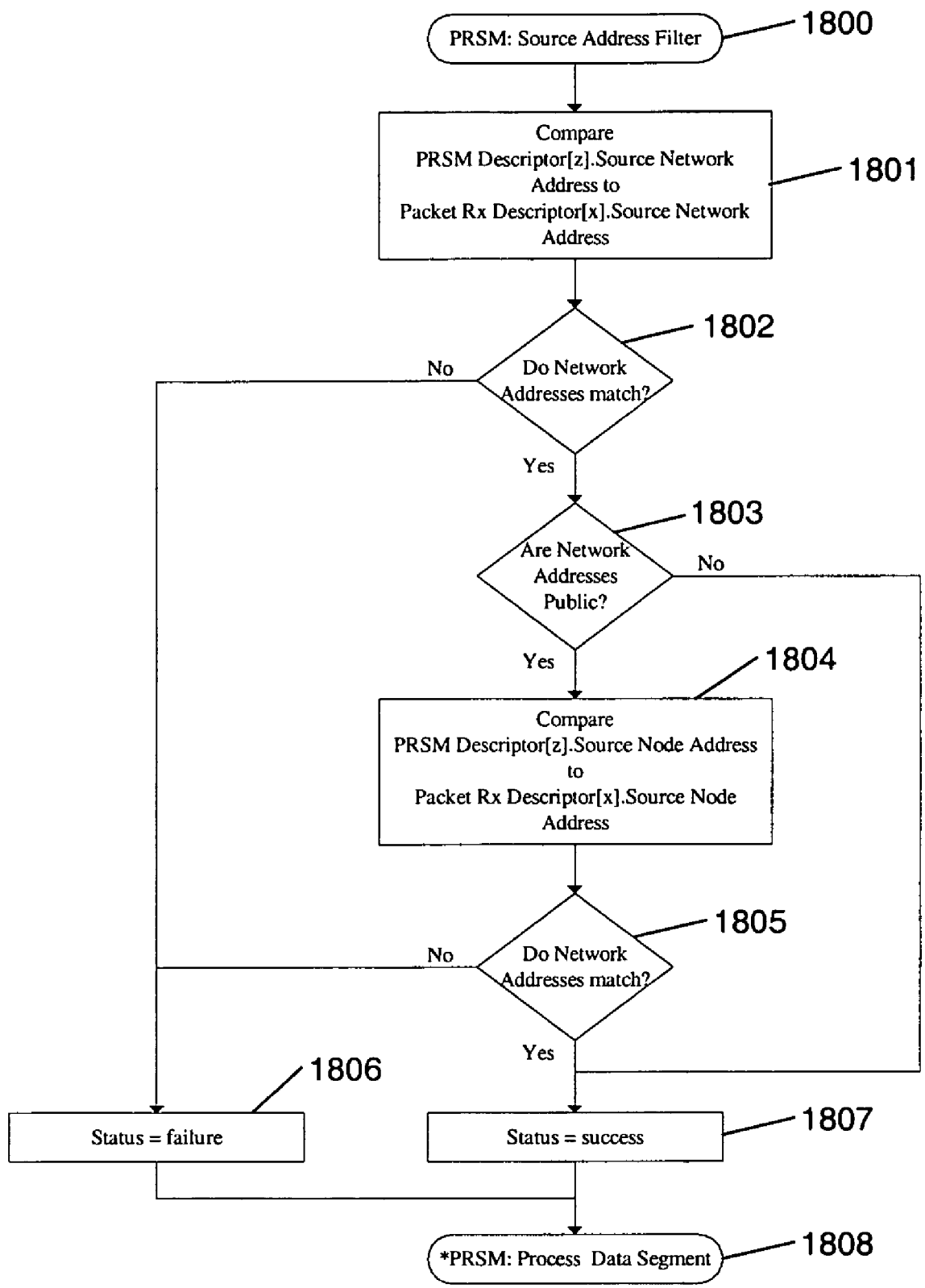
FIG. 18 is a flow diagram of the present preferred upper layer packet reassembly data segment source address filter algorithm.

FIG. 18 is a flow diagram of the present preferred upper layer packet 900 reassembly data segment 304 source address filter algorithm. It is a detailed flow diagram of test 1701. The source address filter algorithm begins 1800. A compare 1801 of the PRSM descriptor source network address is compared to the packet receive descriptor source network address to see if the data segment 304 is part of the upper layer packet 900. If in test 1802, the two addresses are the same the process goes to test 1803. Otherwise, the process sets 1806 the return status to failure and the process ends 1808. In test 1803 the process tests to see if the network address is public. If the network address is not public in test 1803, the process sets 1807 the return status to success and the process returns 1808 the success status. Otherwise, if the network address is public in test 1803, the PRSM source node address is compared 1804 to the packet receive descriptor source node address. If the two node addresses match, the return status is set 1807 to success and the status is returned 1808. If the two node addresses do not match, the return status is set 1806 to failure and the failure status is returned 1808. Otherwise, if test 1805 is successful, the status is set 1807 to success and the success status is returned 1808.

Figure 19:
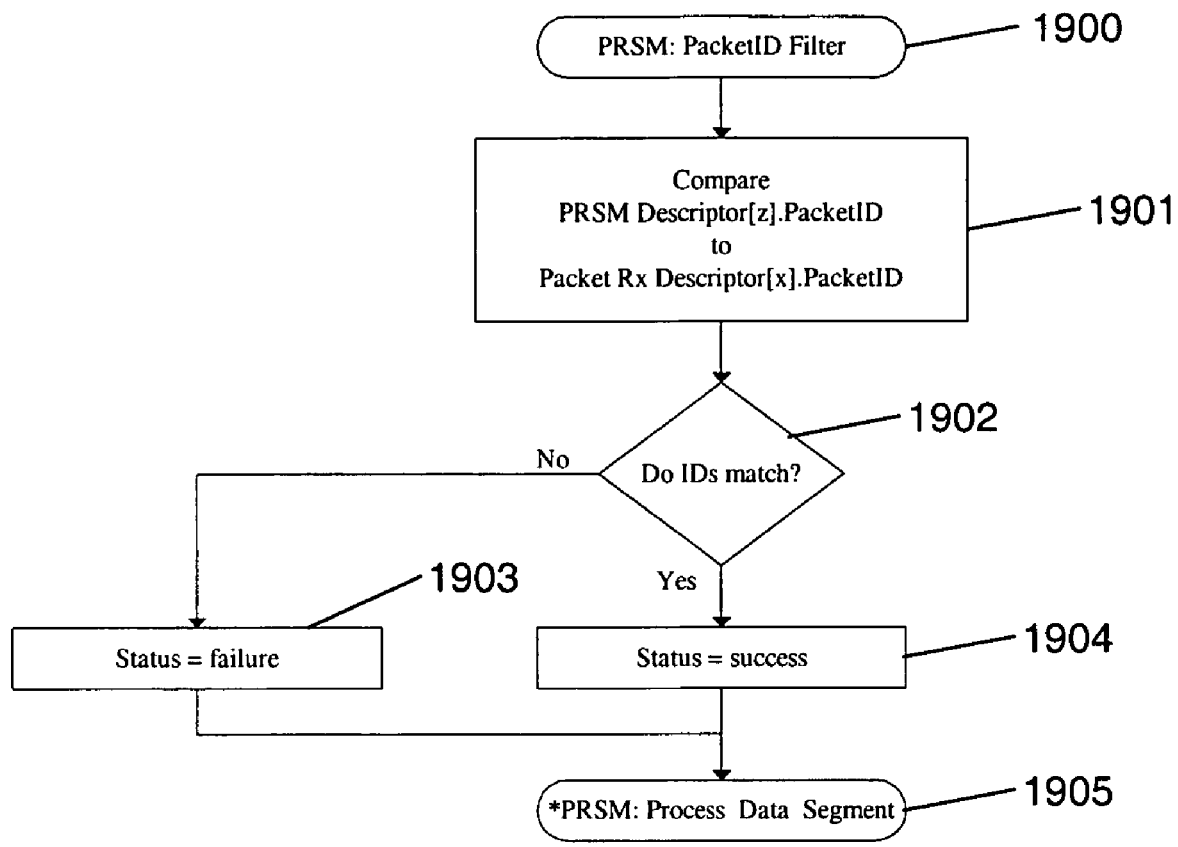
FIG. 19 is a flow diagram of the present preferred upper layer packet reassembly upper layer packet identifier filter algorithm.

FIG. 19 is a flow diagram of the present preferred upper layer packet 900 reassembly upper layer packet identifier filter algorithm. It is a detailed flow diagram of test 1704. The process begins 1900. A compare 1901 is done between the PRSM descriptor packet ID to the packet receive descriptor ID. If in test 1902 the IDs match the return status is set 1904 to success. Otherwise, the return status is set 1903 to failure. The process returns 1905 the status.

Figure 20:
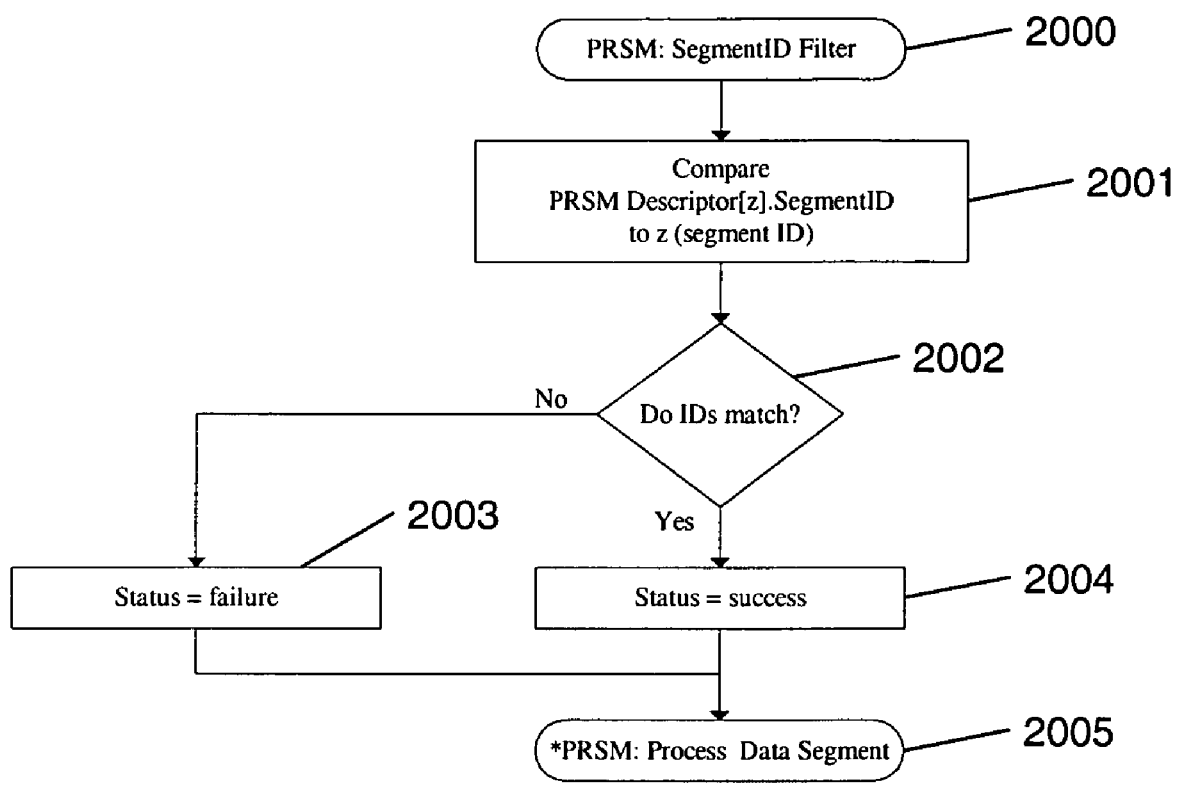
FIG. 20 is a flow diagram of the present preferred upper layer packet reassembly data segment identifier filter algorithm.

FIG. 20 is a flow diagram of the present preferred upper layer packet reassembly data segment identifier filter algorithm. It is a detailed flow diagram of test 1708. The process begins 2000. The PRSM descriptor segment ID is compared 2001 to the current segment descriptor segment ID. The segment ID should be the same if the data segment 304 is the next one needed to reassemble the upper layer packet 900. If the two IDs match, the return status is set 2004 to success. Otherwise, the return status is set 2003 to failure. The process returns 2005 the status.

Figure 21:
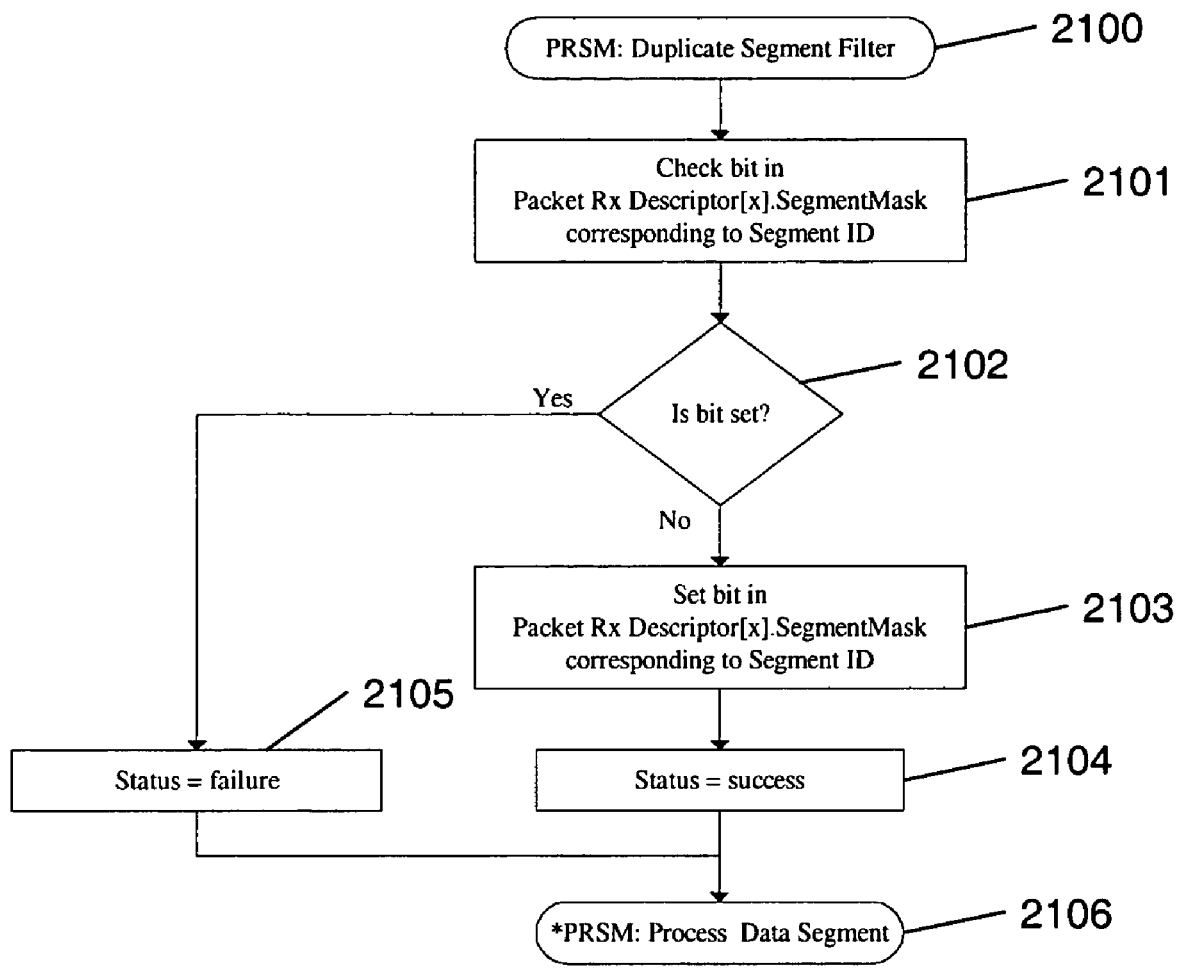
FIG. 21 is a flow diagram of the present preferred upper layer packet reassembly data segment filter algorithm.

FIG. 21 is a flow diagram of the present preferred upper layer packet reassembly segment filter algorithm. It is a detailed flow diagram of test 1709. The process begins 2100. The process checks 2101 to see if the packet receive descriptor segment mask bit is set which corresponds to the segment ID of the current segment being processed. If in test 2102 the bit has been set, the return status is set 2105 to failure. The bit gets set when a data segment 304 has been received so the status is set to failure indicating that the segment has already been received. If in test 2102 the bit has not been set, the packet receive descriptor segment mask bit is set 2103 to indicate that the data segment 304 has been received. The return status is set 2104 to success indicating that the segment is not a duplicate. The process ends 2106 by returning the status.

Figure 22:
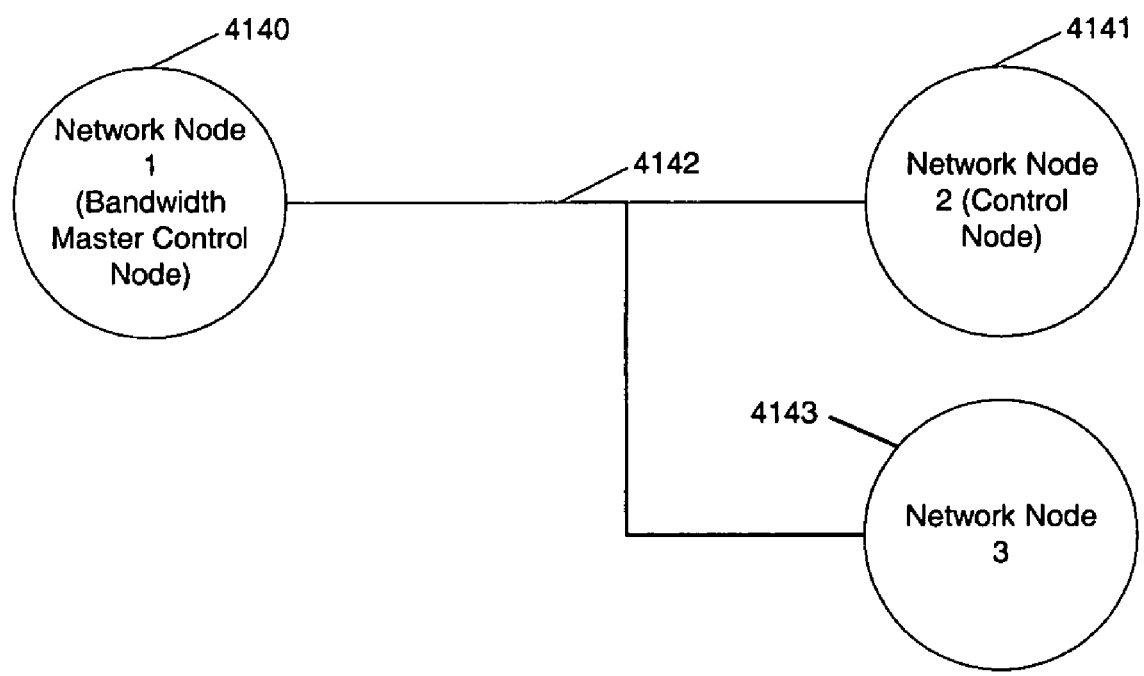
FIG. 22 is a diagram of the present preferred network for sending data segments between network nodes.

FIG. 22 is a diagram of the present preferred network for sending data segments between network nodes. In this document when referring to a network node in the singular, while referencing the single node with multiple nodes indicates that all referenced nodes can perform the same function as the single network node. A network 4142 is formed by plurality network nodes 4140 and 4141. One of the network nodes 4140 is a bandwidth master control node. Segments (packets) are sent across a time division multiplexed data mechanism which includes network 4142 which further includes time slots 4120-4136.

Figure 23:
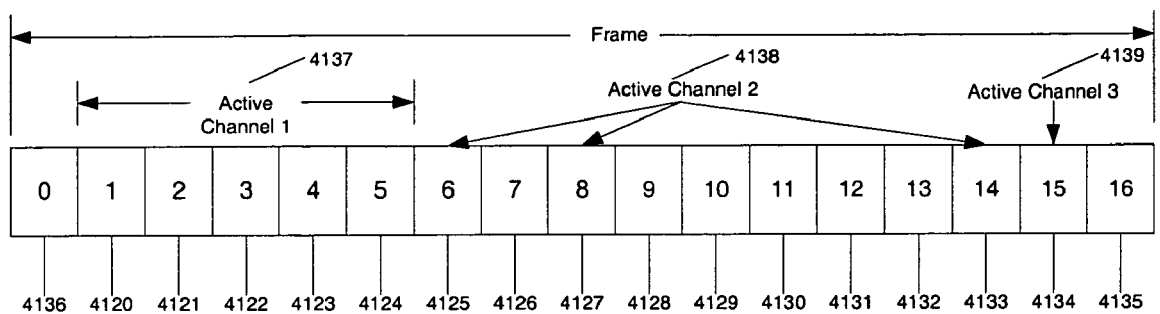
FIG. 23 is a diagram of the Time Division Multiplexed structure of the present preferred embodiment of this invention used to transfer data on a network.

FIG. 23 is a diagram of the time division multiplexed data transfer mechanism of the present preferred embodiment of this invention used to transfer data on a network 4142. Transfer of data across a network 4142 occurs in two forms: packets which are broken up into segments and non-packet. Examples of data include but are not limited to voice, audio, control, video, and computer information and the like. A frame represents the bandwidth of the network 4142 over time and consists of a plurality of time slots 4120-4136. Time slots 4120-4136 in the present preferred embodiment are equal size pieces of Time Division Multiplexed (TDM) bandwidth which is used to transfer data over the AC power line or network 142. Each time slot is presently is 10 bits wide. The actual data sent presently is 32 bits with 22 bits used for forward error correction which results in 10 bits for each time slot. This is a 5/16 rate code. Time slot 4136 is used for frame synchronization across the network 4142 and time slots 4120-4135 are used for data transfer. Data is sent using active channels 4137-4139, which are pieces of network 4142 bandwidth. An active channel 4137-4139 is a variable or fixed size pipe made up of a single time slot or a plurality of time slots used to form a packet or non-packet pipe. For example, an active channel 4137 can be but is not limited to a group of contiguous slots 4120-4124. On the other hand, an active channel 4138 can consist of noncontiguous slots 4126, 4128, 4133. In addition, an active channel 4139 can include a single time slot 4134 or any number of time slots up to the maximum number of time slots in the frame. An active channel 4137-4139 is created by a bandwidth master control node 4140 which is a network node responsible for creating active channels 4137, 4138, and 4139 in conjunction with network nodes 4140, 4141, 4143 on a network 4142. Any network node can assume the role of bandwidth master control node 4140.

To transfer data between nodes, the user or application creates a Virtual Channel (VC) and creates an Active Channel (AC) 4137-4139. However, the virtual channel is not necessary if an active channel 4137-4139 does not need to be persistent. A virtual channel is a grouping of devices that eventually need to communicate with each other and can use the same service type. A service type is unique identifier that represents the type of data being transferred across a network 4142. Virtual channels contain persistent information about how to setup an active channel 4137-4139 when bandwidth is needed. Active channels 4137-4139 are created and destroyed by a network node 4140 that is responsible for bandwidth allocation called a bandwidth master control node 4140. A bandwidth master control node 4140 can control but is not limited to one or more distinct networks 4142 using the same physical medium by using a network number to identify each network 4142. An active channel 4139 is instantiated when a network node 4141 responsible for the active channel 4139 needs to create an active channel 4139, to pass data between network nodes 4140, 4141, 4143 in a active channel 4139. An active channel 4139 will typically exist only as long as the network nodes 4140, 4141 need bandwidth to transfer data while a virtual channel can exists permanently (or until the user or application no longer needs it). On the other hand, an active channel may stay up permanently if necessary. Virtual channels and active channels 4137-4139 are created via a signaling channel (which is an active channel) which is used to exchange information between nodes.

Once the network 4142 is created, virtual channels can be created. For example, virtual channels can be created for, but are not necessarily limited to Internet connections, alarm systems, appliances, home control systems, stereo systems, voice systems, and the like. This can occur from, but is not limited to an administrative console or an application going out and identifying which network nodes 4140, 4141 need to be apart of the virtual channel. A Virtual Channel Structure (VCS) is created which contains all the information necessary to create an active channel 4139. This allows network nodes 4140, 4141, 4143 to recreate an active channel 4139 that existed when power was lost on the network 4142. The virtual channel structure also keeps the network 4142 and the active channel 4139 secure by storing the encryption key information. The process is the same whether new network node 4141, 4142, 4143 is being added to an existing virtual channel or creating a new virtual channel.

Figure 24:
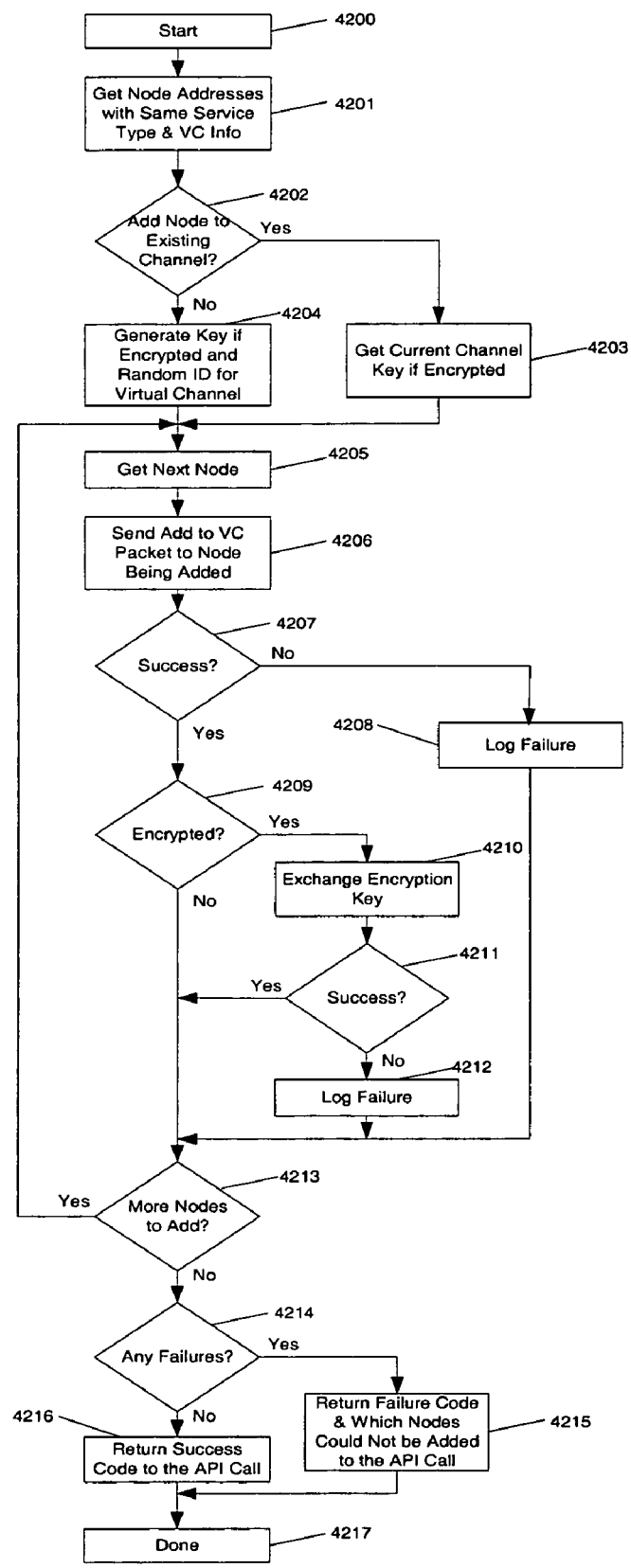
FIG. 24 is a flow diagram of the present preferred virtual channel creation process from the node which is requesting to create a virtual channel.

FIG. 24 is a flow diagram of the preferred virtual channel creation process from a network node 4141 which is requesting to create a virtual channel 4139. A request is made 4200 to create a virtual channel. The user or application generates 4201 a list of network nodes 4140, 4141, 4143 and the service type that are part of the virtual channel. This coupled with a virtual channel name is used to create an active channel 4139. At test 4202 the network node 4141 checks to see if an active channel 4139 already exists. If so, the application goes out and gets 4203 the existing encryption key for the virtual channel. Otherwise, the application generates 4204 a random key and ID for the virtual channel. The virtual channel name and the random ID are used to uniquely identify a virtual channel. In order to create a virtual channel, all network nodes 4140, 4141, 4143 that are part of the virtual channel should be able to communicate on the network 4142 or at a later period in time if being added to the virtual channel. If a network node 4140, 4141, 4143 was not a part of the initial virtual channel creation the network node 4140, 4141, 4143 will have to be added by a network node 4140, 4141, or 4143 that is already apart of the virtual channel in order to have a secure network. After getting 4205 the next network node 4140, 4141, or 4141 to be added, the packet to add the next node to the VC is sent 4206. The packet contains the virtual channel information except the encryption key. If test 4207 is not successful, an error is logged 4208. If test 4207 is successful, and if the active channel 4139 is to be encrypted 4209, the encryption key is passed 4210 using an encryption key passing algorithm. The present preferred embodiment uses Diffie-Hellman key exchange, but a variety of key exchange methods can be used. The encryption key is exchanged 4210. If test 4211 is successful, the process continues to see if more network nodes 4140, 4141, 4143 are to be added 4213. Otherwise, an error is logged 4212 for that network node 4140, 4141 or 4143. Test 4213 checks to see if there are other network nodes 4140, 4141 or 4143 to be added to the virtual channel. If so the process gets 4205 to be added to the virtual channel. Otherwise, there is a check 4214 for any failures. If there were any failures logged in step 4212, they are passed 4215 back to the Application Programming Interface (API). Each network node 4140, 4141, 4143 that failed to be added to the virtual channel and the reason why there was a failure is passed back

4215 to the API. If there were not any failures in test 4214, success is returned 4216 to the API. The process completes 4217.

Figure 25:
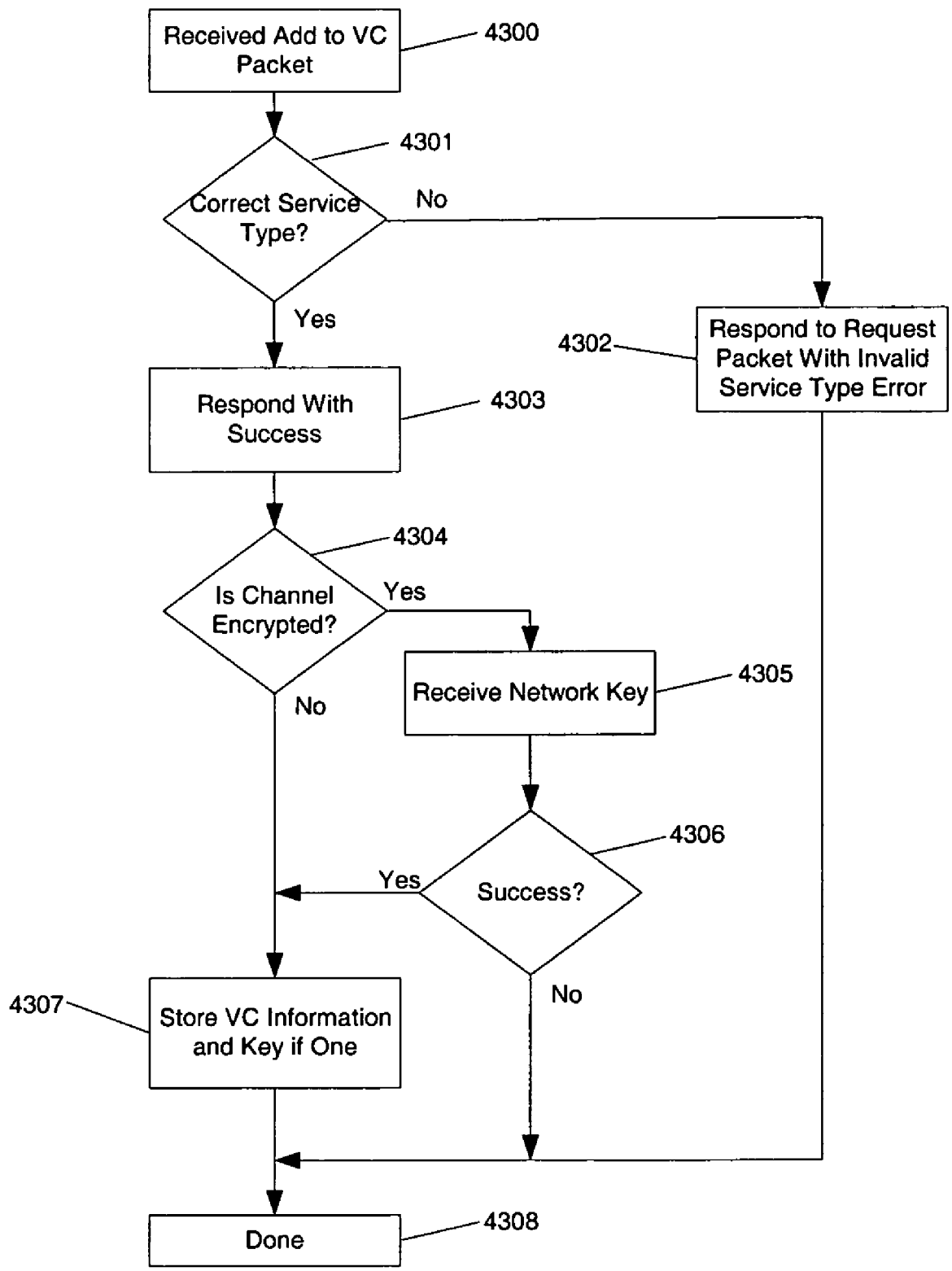
FIG. 25 is a flow diagram of the present preferred virtual channel creation process from the node which is being requested to be apart of the virtual channel.

FIG. 25 is a flow diagram of the present preferred virtual channel creation process from the network node 4140, 4141, 4143 which is being requested to be apart of the virtual channel, wherein FIG. 24 is the flow diagram from the node creating the virtual channel. When a network node 4140, 4141, 4143 receives 4300 an "add to virtual channel packet", the network node 4140, 4141, 4143 checks 4301 the service type to make sure that the service type matches its own service type. If there is not a match, the network node 4140, 4141, 4143 responds 4302 with an error packet. If there is a match in test 4301, the process responds 4303 with a success in the packet status. If the active channel 4139 is supposed to be encrypted in test 4304, the encryption key exchange process is used 4305 to exchange the virtual channel encryption key. If successful in test 4306, the key and the virtual channel information are stored 4307 and the process completes 4308. If the encryption key exchange fails in test 4306, the process completes 4308.

Figure 26:
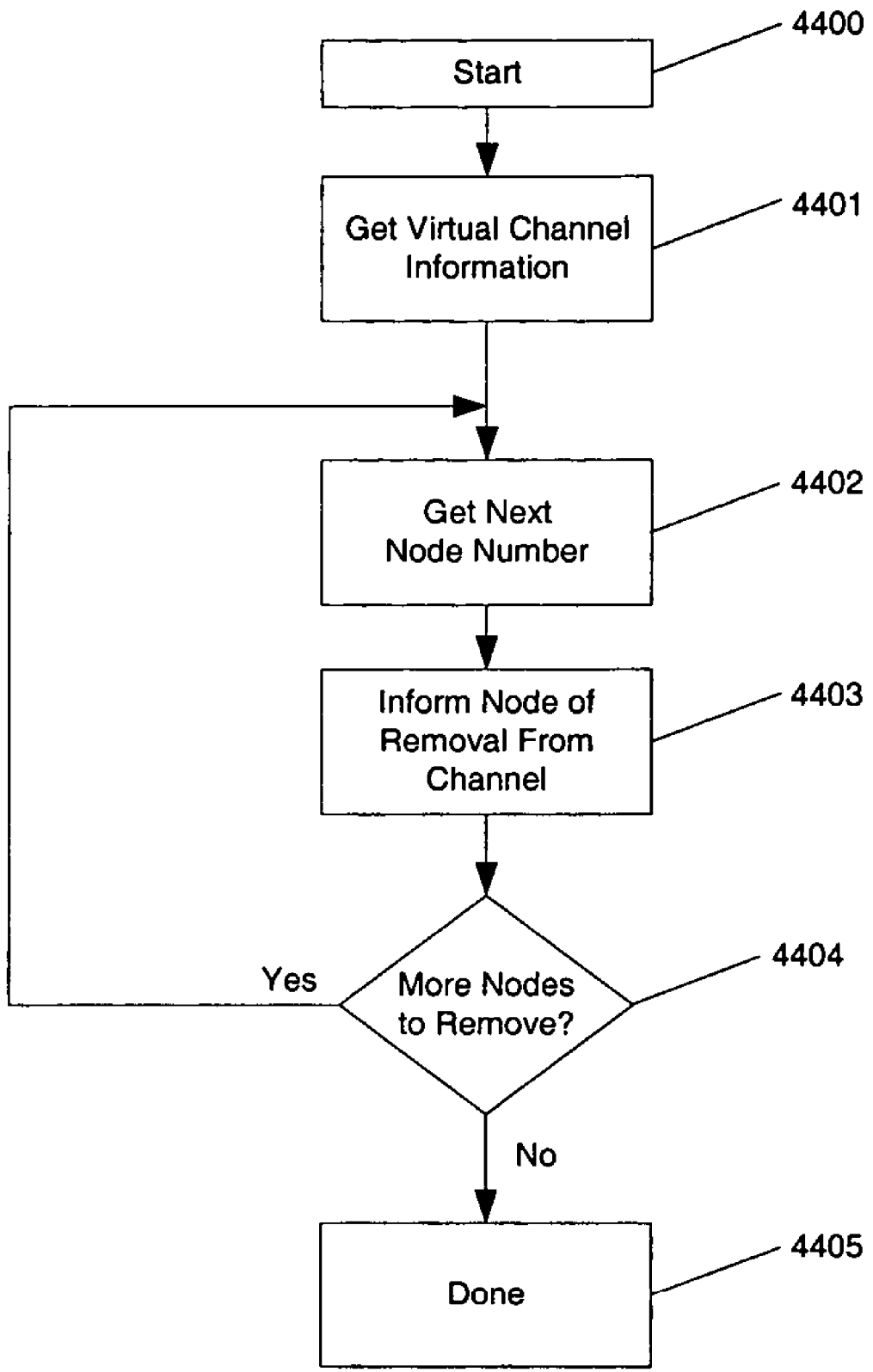
FIG. 26 is a flow diagram of the present preferred virtual channel removal process once a virtual channel is created.

FIG. 26 is a flow diagram of the present preferred virtual channel removal process once an active channel 4139 is created. Under user or application control, a virtual channel can also be removed. Once the process is started 4400, a network node 4140, 4141, 4143 gets 4401 the virtual channel information. The algorithm goes through 4402 each network node that is part of the virtual channel 4140, 4141, 4143 in the list of network nodes 4140, 4141, 4143 and informs each network node 4140, 4141 or 4143 that is the network node 4140, 4141 or 4143 is being removed from the virtual channel at block 4403. The network node 4140, 4141 or 4143 deletes the virtual channel information. This process tests 4404 the next network node 4140, 4141, 4143 on the active channel 4139. If there is another network node 4140 or 4141 in test 4404, the process gets 4402 the next network node number. Otherwise, the process completes 4405. If a network node 4140, 4141 or 4143 cannot respond, the network node 4140, 4141, 4143 can to be removed later using the same process.

In the present preferred embodiment, here are two types of active channels that can be created: A control node active channel, and a peer active channel. A control node active channel is an active channel 4139 where there is one network node 4141 called a control node 4141 responsible for setting up and controlling an active channel 4139. A peer active channel is where network nodes 4140, 4141 can come and go and there is no central control node 4140, 4141 or 4143 responsible for creating an active channel 4139. The control node responsible for a control node active channel or any node responsible for a peer active channel can be any network node 4140 or 4141 on the network 4142 including the bandwidth master control node 4140. In a control node active channel, there is one network node 4141 that is responsible for creating, adding nodes to, and deleting nodes from an active channel 4139. If the control node 4141 is not active, the active channel 4139 cannot be established.

Figure 27:
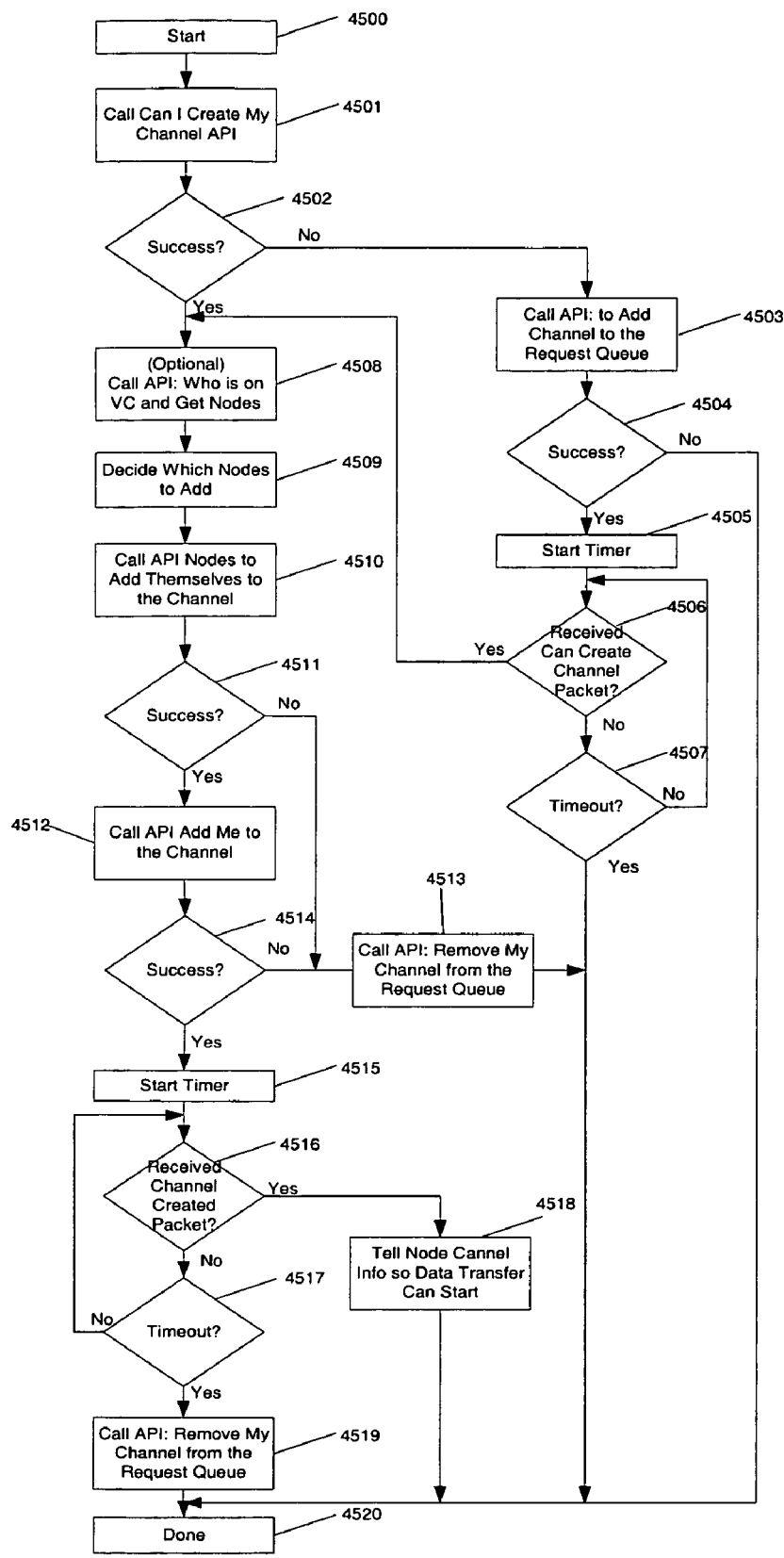
FIG. 27 is a flow diagram of the present preferred control node active channel creation process.

FIG. 27 is a flow diagram of the present preferred control node active channel creation process. First, the application starts 4500 by calling 4501 the "Can I Create My Channel" application programming interface that sends a packet to the bandwidth master control node 4140. The bandwidth master control node 4140 is responsible for creating virtual channels. If the response was not successful in test 4502 and the network node 4140, 4141, 4143 still wants the active channel 4139 to be created when resources are available, the network node 4140, 4141 or 4143 calls 4503 the application programming interface "Add Me to the Channel." This application programming interface call puts the request into the request queue so that the bandwidth master control node 4140 can tell the network node 4140, 4141 or 4143 when an active channel 4139 can be created. If this successful in test 4504, a timer is started 4505 and the bandwidth master control node 4140 looks 4506 for the "You Can Create Your Channel" packet. If this packet is received the creation process optionally calls 4508 the API "who is on VC and get nodes." Otherwise, the process times out 4507 and completes 4520. Once the network node 4140, 4141, or 4143 is informed that the active channel 4139 can be created in test 4502 or test 4506, the network node 4140, 4141, or 4143 goes and determines 4508 which network nodes 4140, 4141, or 4143 are on the active channel 4139 if the network node 4140, 4141, 4143 doesn't know already. The network node 4140, 4141, 4143 decides 4509 which network nodes 4140, 4141, 4143 need to be apart of the active channel 4139 if the network node 4140 or 4141 did not know earlier. The application calls 4510 the Application Programming Interface to Tell a Node to Add Itself to the Channel. When a network node 4140, 4141, 4143 receives a request to add the network node 4140, 4141 or 4143 to an active channel 4139, the network node 4140, 4141, or 4143 informs the bandwidth master control node 4140 and requests that the network node 4140, 4141 or 4143 be added to the active channel 4139. If this is successful, the process responds 4510 to the Tell a Node to Add Itself to the Channel message. If test 4511 was not successful, the control node 4141 calls 4513 the "Remove My Channel from the Request Queue" application programming interface which ends the Active Channel creation. Otherwise, the control node 4141 will add 4512 the control node 4141 to the active channel 4139. If there is a failure in test 4514, the control node 4141 calls 4513 the "Remove My Channel from the Request Queue" application programming interface. Otherwise, the control node 4141 starts 4515 a timer and waits for the packet that indicates that the active channel 4139 was created. Once control node 4141 receives 4516 the packet that indicates the active channel 4139 was created, the control node 4141 tells 4518 all the network nodes 4140, 4141, 4143 using the active channel 4139 the information necessary to use the active channel 4139 and completes the process 4520. If the timer expires in test 4517, the control node 4141 calls 4519 the "Remove My Channel from the Request Queue" application programming interface to remove the request and the process completes 4520.

Figure 28:
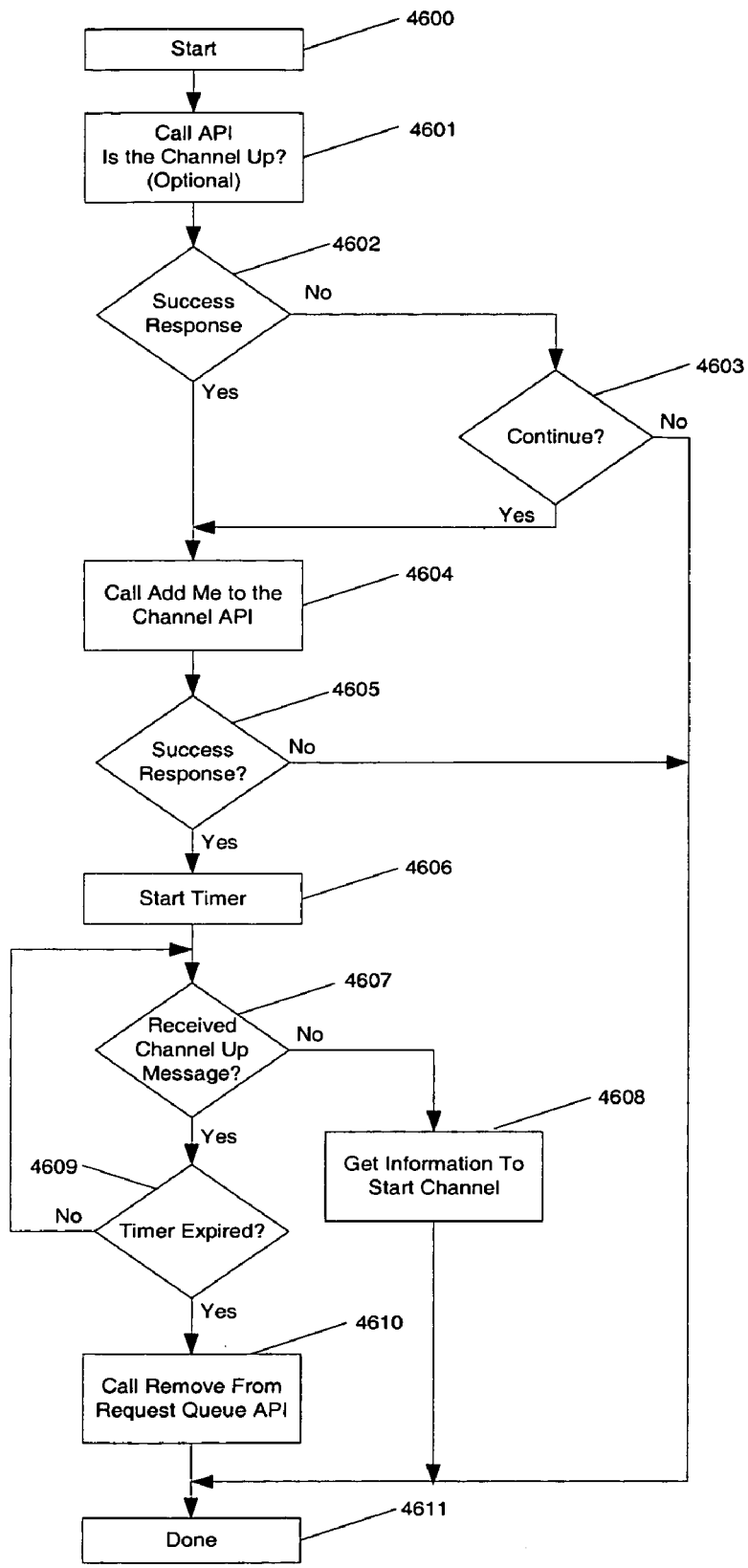
FIG. 28 is a flow diagram of the present preferred channel creation process for a peer active channel.

For peer networks, the process happens differently. This is because in a peer network, any network node 4140 or group of network nodes 4140, 4141, 4143 can be up at any time. For this reason, any network node 4140, 4141 or 4143 can initiate the process that creates an active channel 4139. A network node 4140, 4141 or 4143 can request to be added to an active channel 4139, but an active channel 4139 will not be created until at least two network nodes 4140, 4141 have requested to be added to the active channel 4139. FIG. 28 is a flow diagram of the present preferred active channel 4139 creation process for a peer active channel. On a peer active channel, a network node 4140 or 4141 can optionally go out 4600 and see if the active channel 4139 is up 4601. In test 4602 if the response is unsuccessful, the network node 4140, 4141, 4143 can decide if the network node 4140, 4141, 4143 wants to continue in test 4603 or quit. If the network node 4140, 4141, 4143 wants to quit, the process completes 4611. If the network node 4140, 4141, 4143 wants to continue, network node 4140, 4141, 4143 calls 4604 the Application Programming Interface Add Me to a Channel. Step 4604 is also called if test 4602 is successful. If test 4605 is unsuccessful the process completes 4611. Otherwise, if test 4605 is successful, the network node 4140, 4141 or 4143 starts a timer 4606 in which the network node 4140, 4141 or 4143 looks 4607 for the channel is up packet. If the network node 4140, 4141, 4143 receives this message the network node 4140, 4141, 4143 joins 4608 the active channel 4139 and the process completes 4611. Otherwise, if there is a timeout 4609, the network node 4140, 4141, 4143 removes 4610 the network node's 4140, 4141, 4143 request to be added from the request queue and ends the process 4611. This process works the same for a network node 4140, 4141 or 4143 being added after an active channel 4139 is up. To remove an active channel 4139, a network node 4140, 4141 or 4143 can call the remove a channel API. The bandwidth master control node 4140 will inform each network node 4140, 4141, 4143 that is currently apart of the active channel 4139 that the active channel 4139 is being torn down.

Figure 29:
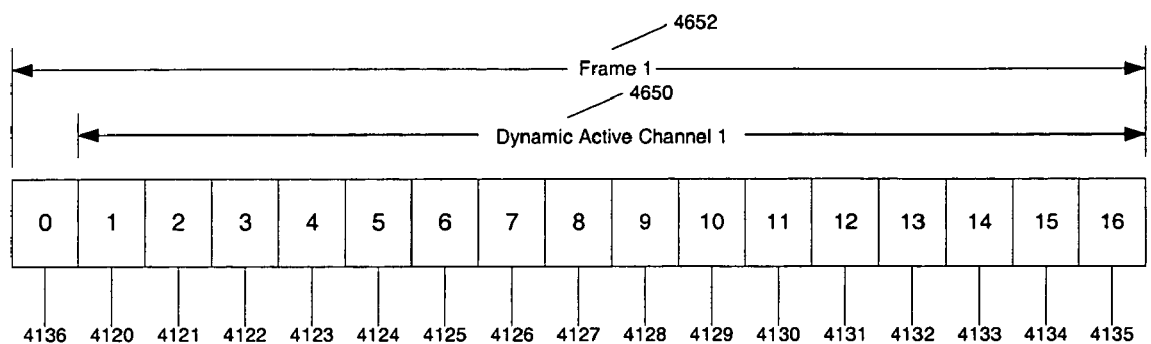
FIG. 29 is a diagram of the present preferred dynamic active channel resizing.
Figure 29:
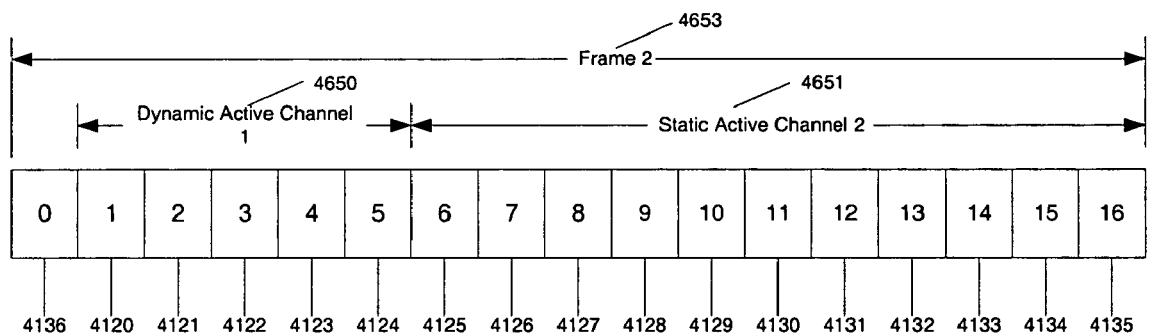

FIG. 29 is a diagram of the present preferred dynamic active channel resizing. When a dynamic active channel 4650 is created, there are two fields: The minimum bandwidth value and maximum bandwidth value. These fields are used by the bandwidth master control node 4140 to create dynamic active channels 4650 that can be increased or decreased based on available bandwidth. Active channels can be either static active channels 4651 or dynamic active channels 4650. A dynamic active channel 4650 is one where the dynamic active channel's 4650 size (the number of time slots 4120-4135 the active channel 4650 uses) can change dynamically and a static active channel 4651 will always require the same number of time slots 4125-4135 in this example. FIG. 29 depicts a static active channel 4651 that uses 11 time slots 4125-4135. The size of a static active channel 4651 can be any size from one time slot to the maximum number of time slots 4120-4135 that the system uses. A dynamic active channel 4650 can be resized on the fly down to the minimum bandwidth value or up to the maximum bandwidth value. The minimum bandwidth field and maximum bandwidth fields will be the same for a static active channel 4651. These fields are coupled with the bandwidth priority value are used to track the priority of the dynamic active channel 4650 or static active channel 4651 and whether the channel is a static active channel 4651 or a dynamic active channel 4650. The preferred embodiment uses the following four priorities: 1. Guaranteed Priority, 2. High Priority, 3. Normal Priority, and 4. Low Priority. Bandwidth is allocated on a priority basis, thus allowing a higher priority dynamic active channels 4650 or static active channels 4651 to take bandwidth from lower priority channels. When a dynamic active channel 4650 is first created the dynamic active channel 4650 takes all free time slots up to the maximum bandwidth value. Dynamic active channel one 4650 has a minimum bandwidth value of one and a maximum bandwidth value of fifteen. Frame one 4652 shows dynamic channel one 4650 taking all time slots 4120-4135 when dynamic active channel one 4650 is first created on an unused network 4142. When a new channel is created (static or dynamic) bandwidth is taken from dynamic channels 4650. For example, if after dynamic active channel one 4650 is created, the dynamic active channel one 4650 is dropped in frame two 4653 to 5 time slots 4120-4124 as a new static active channel one 4651 is created even if static active channel one 4651 is a lower priority. The minimum bandwidth value and the maximum bandwidth values are only limited by the number of time slots 4120-4135 available. Once there are no dynamic slots available, active channels are created or deleted based on priority. Priority is not limited to but in the present preferred embodiment is on a first come first serve basis. This means that a new active channel cannot be created if all the slots are allocated by active channels at the same or higher priority.

Figure 30:
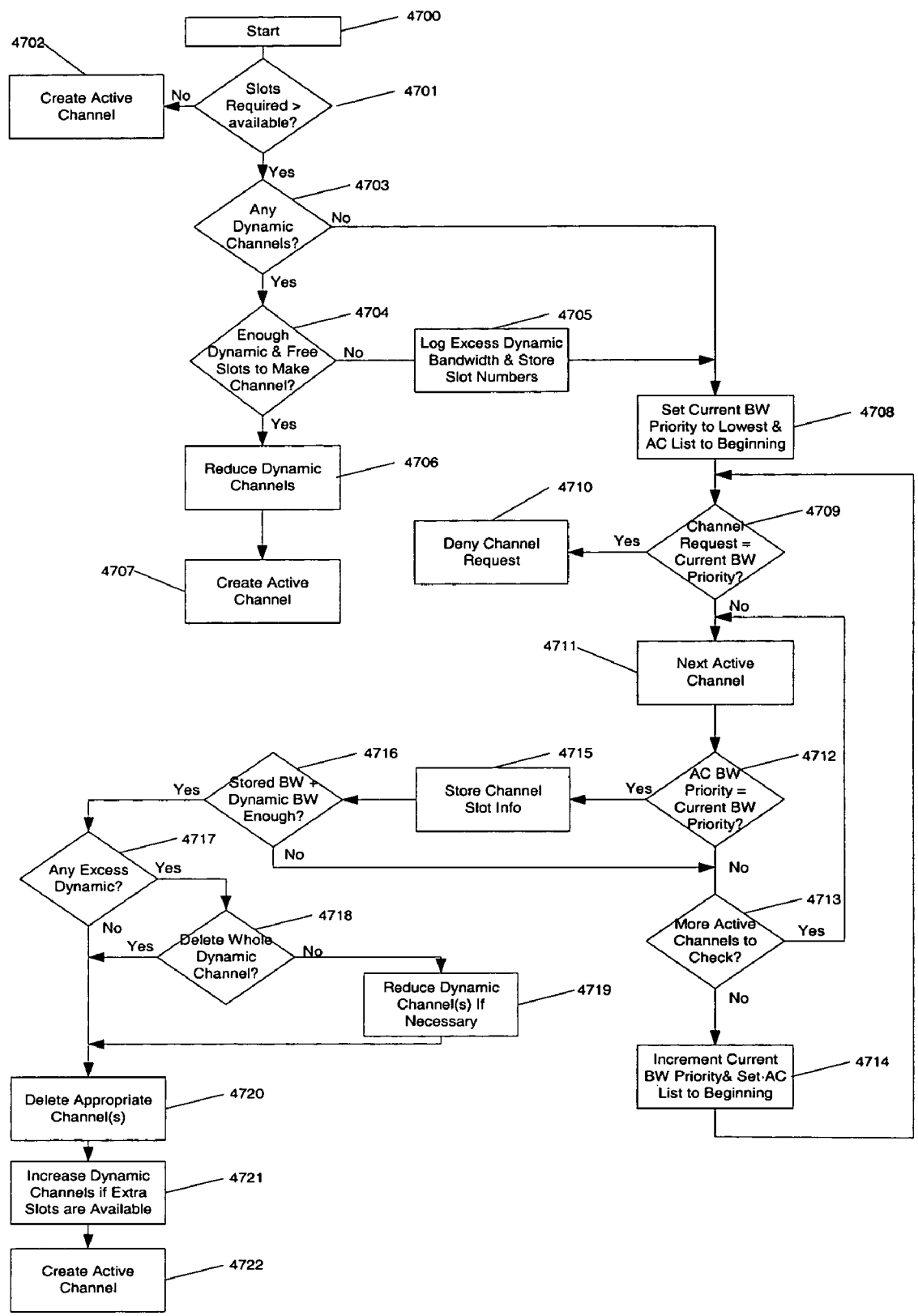
FIG. 30 is a flow diagram of the present preferred process for bandwidth allocation using channel priorities.

FIG. 30 is a flow diagram of the preferred process for bandwidth allocation using channel priorities. Once a new active channel 4651 needs to be created 4700, the bandwidth master control node 4140 first looks 4701 to see if there are enough free time slots 4120-4135 to create the new active channel 4651. An active channel 4651 will be created if there are at least enough free time slots 4120-4135 to meet the minimum bandwidth value. If so, the new active channel 4651 is created 4702. Otherwise, the bandwidth master control node 4140 looks 4703 to see if there are any dynamic active channels 4650. The process checks 4704 to see if there are enough dynamic and free time slots 4120-4135 to create the new active channel 4651. If the process determines that the dynamic channels 4650 have enough excess bandwidth (the difference between the minimum bandwidth value and the current size of the dynamic active channel 4650) to create the new active channel 4651, the dynamic active channel(s) 4650 size is reduced 4706 and the new active channel 4651 is created 4707. If the time slots 4120-4125 to create the new active channel 4651 are coming from multiple dynamic active channels 4650, the time slots 4120-4135 used come from the lowest priority dynamic active channel 4650 first in the present preferred embodiment. If the active channels are at the same priority, the process is done (but not required to) on a first come first serve basis. If there are not enough excess dynamic time slots 4120-4135 available 4704, the time slots 4120-4135 are logged 4705 and stored for use later. If there is not enough bandwidth at steps 4703 or 4705, the current bandwidth priority value is set 4708 to the lowest priority. The current bandwidth priority value is used to search through the active channel list for priorities that match it. The active channel list is set 4708 to point to the beginning of the list of active channels. The request to build the new active channel 4651 is checked 4709 to see if the new active channel 4651 is at the current search bandwidth priority. If so, a deny channel packet is sent 4710 to the control node 4141 and the process ends. Otherwise, the channel search process continues by getting 4711 the next active channel from the list. The current active channel's bandwidth priority is compared 4712 to the current search bandwidth priority. If a match is not found, the process tests 4713 to see if there are more active channels in the list. If there are more active channels in the list to check 4713, the process gets the next active channel in the list 4711. Otherwise if test 4713 is no, the active channel list search pointer is set 4714 back to the beginning, the current bandwidth priority is incremented, and the process checks to see if the new channel request is equal 4709 to the current bandwidth priority. When an active channel is found that is at a lower bandwidth priority than the new active channel 4651 and is at the current search bandwidth priority in test 4712, the information is stored 4715. This information along with the slot information of any excess dynamic channel slots 4120-4135 from step 4705 and any previous lower priority time slots 4120-4135 are checked 4716 to see if there are enough time slots 4120-4135 to make the new active channel 4651. If not, the process returns to the channel search process and checks 4713 to see if there are more active channels in the list. Otherwise, the process of creating the new active channel 4651 begins. If there are excess dynamic slots available 4717, the bandwidth master control node 4140 checks to see if the whole dynamic active channel 4650 to which the excess dynamic time slots 4120-4135 are tied needs to be deleted 4718. If not, the dynamic active channel's 4650 size is reduced 4719 if necessary. It may not be necessary to reduce the active dynamic channel 4650 if the excess dynamic time slots 4120-4135 are not great enough to be used in the new active channel 4651 in step 4719. The necessary channel or channels are deleted 4720. If there are any excess slots that can be used in dynamic channels 4650, the excess slots are reassigned 4721 to the appropriate channel or channels. Finally, the new active channel 4650 is created 4722.

Figure 31:
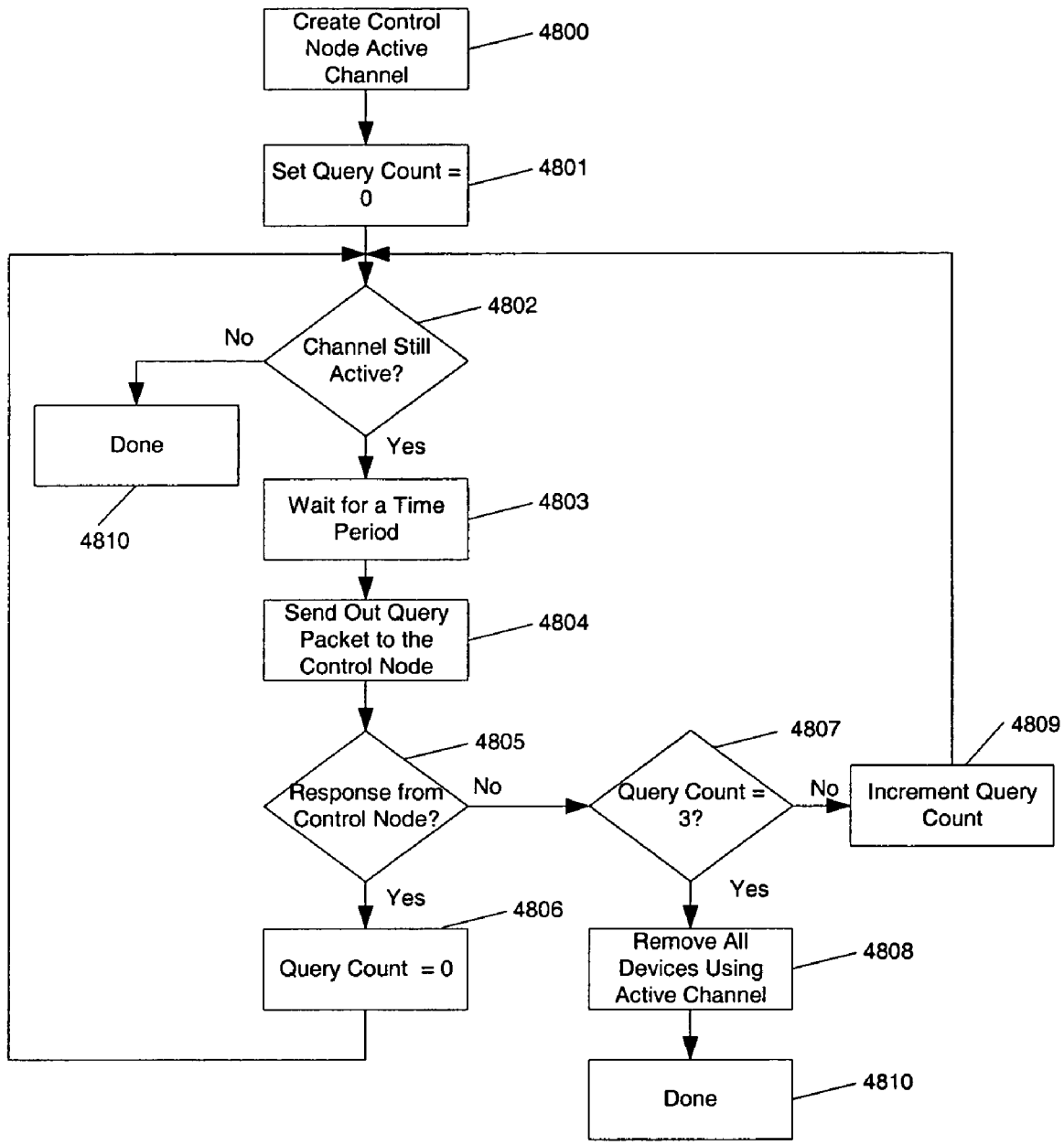
FIG. 31 is a flow diagram of the present preferred process for bandwidth reclamation in a control node active channel.

FIG. 31 is a flow diagram of the present preferred process for bandwidth reclamation in a control node active channel. The process begins when a control node active channel is created 4800 on the bandwidth master control node 4140. The control node active channel has a control node 4141 and a network node 4143 that use the control node active channel. The query count is then set 4801 to zero. The process then tests 4802 to see if the control node active channel is still active. If not the process is done 4810. Otherwise, if the control node active channel is still active 4802, the process waits 4803 for a period of time. The process sends 4804 out a query packet to the control node 4141. If a response to the query packet is received in test 4805 from the control node 4141, the query count is set 4806 to zero and the process tests 4802 to see if the control node active channel is still active. Otherwise, if there is no response from the control node 4141 in test 4805, the query count is checked 4807 to see if it is three. In the present preferred embodiment, the query count is three, but this value could be dynamic or another value as the needs of the system require. If the query count is three 4807, all network nodes 4141, 4143 using the control node active channel are removed 4808 from the control node active channel by sending remove from channel packets to each network node using the control node active channel and the process is done 4810. Otherwise, if the query count is not three in test 4807, the process increments 4809 the query count and checks 4802 to see if the control node active channel is still active.

Figure 32:
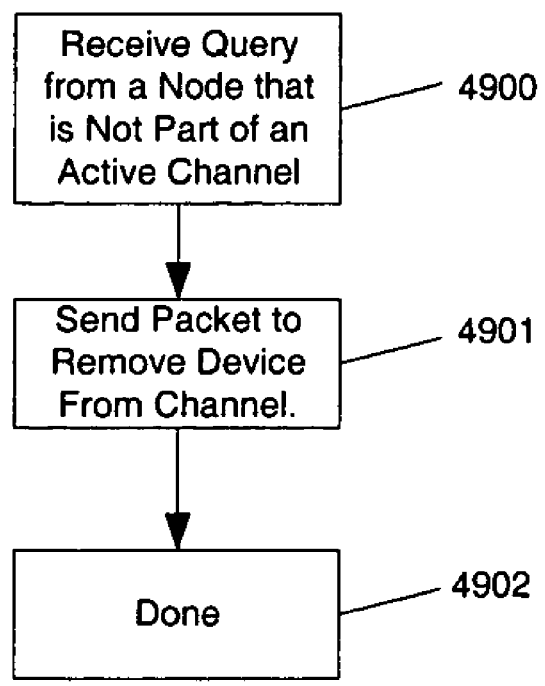
FIG. 32 is a flow diagram of the present preferred process for notifying network nodes that the network node is no longer part of an active channel.

FIG. 32 is a flow diagram of the present preferred process for notifying network nodes that the network node is no longer part of an active channel. When a control node 4141 or a network node 4143 cannot see query packets from the bandwidth control node master 4140 for reasons such as network noise and the like, these network nodes may have been removed from an active channel without being informed. If a network node 4141, 4143 cannot see the bandwidth master control node 4140; the network nodes 4141, 4143 send query packets to the bandwidth master control node 4140. If the bandwidth master control node 4140 receives 4900 a query from a network node 4140 or a control node 4141 and that node is no longer apart of the active channel associated with the query, the bandwidth master control node 4140 will then send 4901 a packet to remove network node 4140 or 4141 from the active channel. The process is then done 4902.

Figure 33:
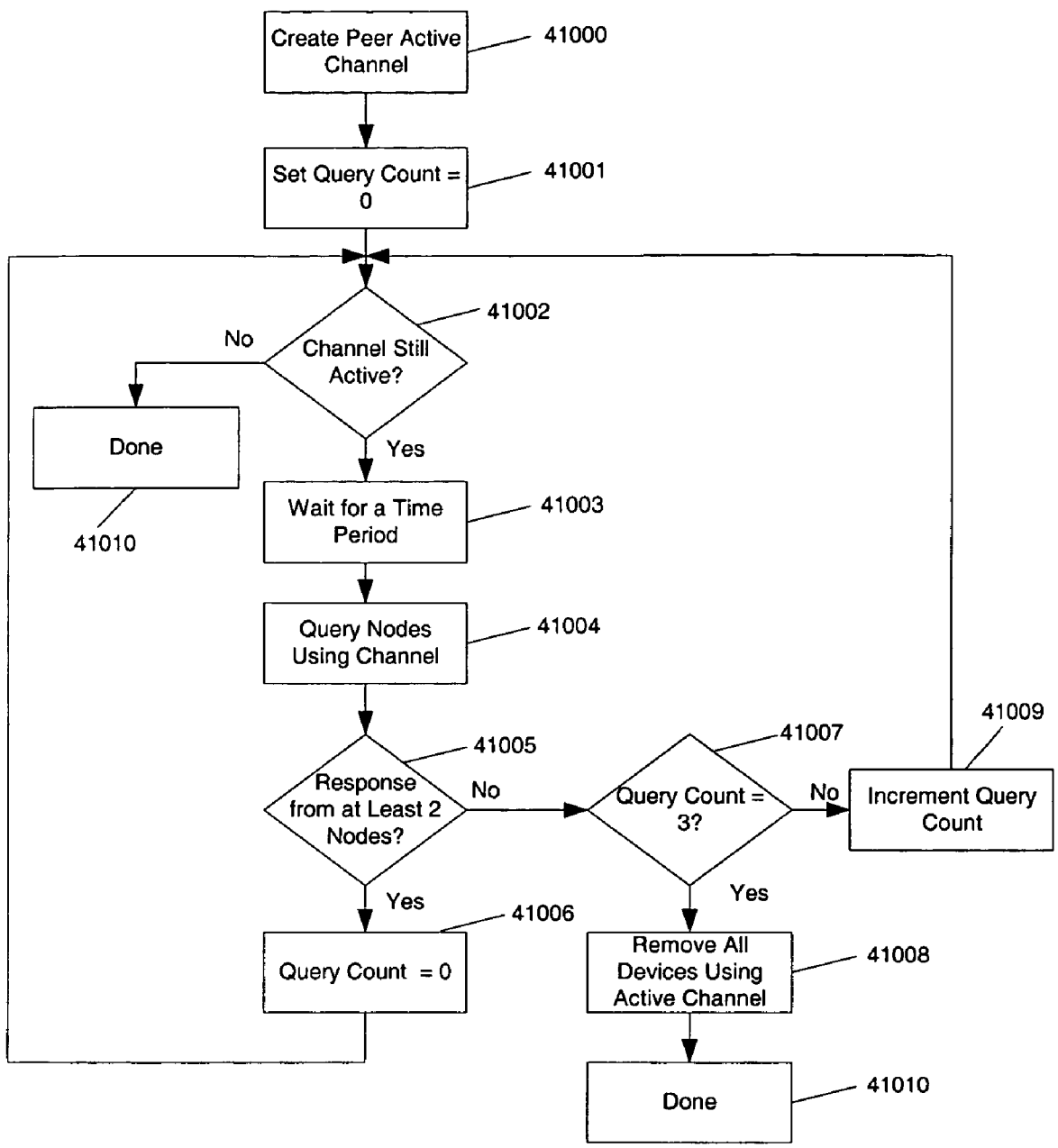
FIG. 33 is a diagram of the present preferred process for bandwidth reclamation in a peer active channel.

FIG. 33 is a diagram of the present preferred process for bandwidth reclamation in a peer active channel. The process begins when a peer active channel is created 41000 on the bandwidth master control node 4140 where the peer channel has two network nodes 4141, 4143 that use the peer channel. The query count is then set 41001 to zero. The process then tests 41002 to see if the peer active channel is still active. If not the process is done 41010. Otherwise, if the peer active channel is still active 41002, the process waits 41003 for a period of time. The process sends 41004 out query packets to network nodes 4141, 4143 on the peer active channel until at least two network nodes 4141, 4143 respond or all network nodes have been queried. If a response to at least two of the query packets is received in test 41005, the query count is set 41006 to zero and the process tests 41002 to see if the peer active channel is still active. Otherwise, if there is no response from at least two network nodes 4141 and 4143 in test 41005, the query count is checked 41007 to see if it is three. In the present preferred embodiment, the query count is three, but this value could be dynamic or another value as the needs of the system require. If the query count is three 41007, all the network nodes 4141, 4143 using the peer active channel are removed 41008 from the peer active channel by sending remove from channel packets to each network node 4141, 4143 using the peer active channel and the process is done 41010. Otherwise, if the query count is not three in test 41007, the process increments 41009 the query count and checks 41002 to see if the peer active channel is still active.

These data transportation methods are designed so that they will run over a variety of networks, but are not limited to such types of networks as AC power line, DC power line, light frequency (fiber, infrared, light, and the like), Radio Frequency (RF) networks (wireless such as 802.11b, and the like), and wired (coax, twisted pair, and the like.).

In addition, these data transportation methods can be implemented using a variety of process, but are not limited to computer hardware, microcode, firmware, software, and the like.

The described embodiments of this invention are to be considered in all respects only as illustrative and not as restrictive. Although specific flow diagrams and segment formats are provided, the invention is not limited thereto. The scope of this invention is, therefore, indicated by the claims rather than the foregoing description. All changes, which come within the meaning and range of equivalency of the claims, are to be embraced within their scope.

The invention claimed is:

1. A system for sending segments using different forward error correction methods on a network comprising:
   a plurality of network nodes forming a network;
   a time division multiplexed data transfer link which is divided into a plurality of time slots for transfer of one or more variable length data segments that include a data segment error detection mechanism segment and an acknowledgement segment between said plurality of network nodes on said network;
   wherein said plurality of network nodes includes a sending network node;
   said sending network node further including a dynamic forward error correction encoder which generates said one or more variable length data segments having a dynamic preamble based on the length of said one or more variable length data segments and wherein said dynamic forward error correction encoder generates a forward error correction field which size is based on the dynamic preamble; and
   wherein said encoder selects based upon the number of errors and the type of errors on the network of a communication channel associated with said sending network node, the error correction method and the amount of error correction to be used to adapt dynamically to changing network error conditions.

2. A system for sending segments using different forward error correction methods on a network as recited in claim 1, wherein said network is selected from the group consisting of a wireless network, a light frequency network, a power line network, and a wired network.

3. A system for sending segments using different forward error correction methods on a network as recited in claim 1, wherein said dynamic forward error correction encoder encodes a segment with a forward error correction method selected from the group consisting of Hamming codes, Convolutional codes, Reed-Solomon codes, Low Density Parity Check Codes, Trellis codes, Block Turbo codes and Walsh codes.

4. A system for sending segments using different forward error correction methods on a network as recited in claim 1, wherein said dynamic forward error correction encoder generates a preamble that is 40 bits in length.

5. A system for sending segments using different forward error correction methods on a network as recited in claim 1, wherein said dynamic forward error correction encoder encodes segments with a (5/16) rate forward error correction code.

6. A system for sending segments using different forward error correction methods on a network as recited in claim 1, wherein said dynamic forward error correction encoder generates a preamble that indicates no forward error correction.

7. A system for sending segments using different forward error correction methods on a network as recited in claim 1, wherein said dynamic forward error correction encoder generates a preamble based on a network condition.

8. A system for sending segments using different forward error correction methods on a network as recited in claim 7 wherein said network condition is selected from the group consisting of one or more cyclic redundancy check errors and one or more forward error correction errors.

9. A system for receiving segments using different forward error correction methods on a network comprising:
a plurality of network nodes forming a network wherein said plurality of network nodes includes a receiving network node;
a time division multiplexed data transfer link which is divided into a plurality of time slots for transfer of one or more variable length data segments between said plurality of network nodes on said network;
wherein said receiving network node includes a dynamic forward error detection decoder which decodes said one or more variable length data segments and determines the length of said one or more variable length data segments based at least in part upon a preamble; and
wherein the decoder uses an error correction method and an amount of error correction based upon the number of errors and the type of errors on the network of a communication channel associated with said receiving network node to adapt dynamically to changing network error conditions.

10. A system for receiving segments using different forward error correction methods on a network as recited in claim 9, wherein said dynamic forward error correction decoder decodes said data segments with a method selected from the group consisting of Hamming codes, Convolutional codes, Reed-Solomon codes, Low Density Parity Check Codes, Trellis codes, Block Turbo codes and Walsh codes.

11. A system for receiving segments using different forward error correction methods on a network as recited in claim 9, wherein said dynamic forward error correction decoder is used to detect errors within said one or more data segments.

12. A system for receiving segments using different forward error correction methods on a network as recited in claim 9, wherein said dynamic forward error correction decoder is used to correct errors within said one or more data segments.

13. A system for receiving segments using different forward error correction methods on a network as recited in claim 9, wherein said dynamic forward error correction decoder decodes based at least in part upon a preamble that is 40 bits in length.

14. A system for receiving segments using different forward error correction methods on a network as recited in claim 9, wherein said dynamic forward error correction decoder decodes data using a 5/16 rate forward error correction code.

15. A system for receiving segments using different forward error correction methods on a network as recited in claim 9, wherein said dynamic forward error correction decoder decodes a preamble which indicates no forward error correction.

16. A system for receiving segments using different forward error correction methods on a network as recited in claim 9, wherein said network is selected from the group consisting of a wireless network, a light frequency network, a power line network, and a wired network.

17. A system for receiving segments using different forward error correction methods on a network as recited in claim 9, wherein said dynamic forward error correction decoder decodes a forward error correction segment size based at least in part upon a preamble.

18. A method for sending segments using different forward error correction methods on a network comprising:
selecting a forward error correction method, the amount of error correction to use and an associated preamble based on the number of errors and the type of errors on the network of a communication channel associated with a sending network node to dynamically adapt to changing network error conditions on the network;
adding forward error correction to the segment data; and
sending said associated preamble, which identifies said forward error correction method and contains said segment data, from said sending network node across a time division multiplexed network.

19. A method for sending segments using different forward error correction methods on a network as recited in claim 18, wherein sending said segment data further comprises sending said segment data on said network further comprising a network selected from the group consisting of a wireless network, a light frequency network, a power line network, and a wired network.

20. A method for sending segments using different forward error correction methods on a network as recited in claim 18, wherein selecting said forward error correction method further comprises selecting a forward error correction method selected from the group consisting of Hamming codes, Convolutional codes, Reed-Solomon codes, Low Density Parity Check Codes, Trellis codes, Block Turbo codes and Walsh codes.

21. A method for sending segments using different forward error correction methods on a network as recited in claim 18, wherein said selecting said associated preamble further comprises selecting a preamble that is 40 bits in length.

22. A method for sending segments using different forward error correction methods on a network as recited in claim 18, wherein selecting said forward error correction method further comprises selecting a forward error correction method which uses a 5/16 rate forward error correction code.

23. A method for sending segments using different forward error correction methods on a network as recited in claim 18, wherein selecting said preamble further comprises selecting a preamble which indicates no forward error correction.

24. A method for sending segments using different forward error correction methods on a network as recited in claim 18, wherein said selecting of said forward error correction method is based at least in part upon said segment data length.

25. A method for sending segments using different forward error correction methods on a network as recited in claim 18, wherein said selecting of said forward error correction method further comprises selecting a forward error correction method based at least in part upon a network condition.

26. A method for sending segments using different forward error correction methods on a network as recited in claim 25 wherein said selecting of said forward error correction method further comprises selecting a forward error correction method based at least in part upon a network condition selected from the group consisting of one or more cyclic redundancy check errors and one or more forward error correction errors.

27. A method for receiving segments using different forward error correction methods on a network comprising:
   receiving a preamble and segment data encoded with forward error correction on a receiving network node on a time division multiplexed network; and
   determining from said preamble a forward error correction method and the amount of error correction to use based on the number of errors and the type of errors on the network of a communication channel associated with said receiving network node, to dynamically adapt to changing network error conditions on the network.

28. A method for receiving segments using different forward error correction methods on a network as recited in claim 27, wherein said network is selected from one of: a wireless network, a light frequency network, a power line network, and a wired network.

29. A method for receiving segments using different forward error correction methods on a network as recited in claim 27, wherein determining said forward error correction method further comprises determining a forward error correction code's length.

30. A method for receiving segments using different forward error correction methods on a network as recited in claim 27, wherein determining said forward error correction method further comprises determining said segment data's length based on said preamble.

31. A method for receiving segments using different forward error correction methods on a network as recited in claim 27, wherein determining said forward error correction method further comprises correcting errors in said segment data using an error detecting method selected from the group consisting of Hamming codes, Convolutional codes, Reed-Solomon codes, Low Density Parity Check Codes, Trellis codes, Block Turbo codes and Walsh codes.

32. A method for receiving segments using different forward error correction methods on a network as recited in claim 27, wherein determining a forward error correction method further comprises detecting a preamble that is 40 bits in length.

33. A method for receiving segments using different forward error correction methods on a network as recited in claim 27, wherein determining a forward error correction method further comprises detecting a forward error correction method using a $5/16$ rate forward error correction code.

34. A method for receiving segments using different forward error correction methods on a network as recited in claim 27, wherein determining a forward error correction method further comprises detecting a preamble that indicates no forward error correction.

* * * * *